US009306623B2

(12) United States Patent
De Coi et al.

(10) Patent No.: US 9,306,623 B2
(45) Date of Patent: Apr. 5, 2016

(54) MEASUREMENT TAPE FOR AN ELEVATOR DEVICE

(71) Applicant: CEDES AG, Landquart (CH)

(72) Inventors: Beat De Coi, Sargans (CH); Christian E. Thöny, Oberägeri (CH); Tobias Leutenegger, Chur (CH); Jan Giger, Jenaz (CH)

(73) Assignee: Cedes AG, Landquart (CH)

( * ) Notice: Subject to any disclaimer, the term of this patent is extended or adjusted under 35 U.S.C. 154(b) by 48 days.

(21) Appl. No.: 14/469,717

(22) Filed: Aug. 27, 2014

(65) Prior Publication Data

US 2015/0059195 A1 Mar. 5, 2015

(30) Foreign Application Priority Data

Aug. 29, 2013 (EP) .................................. 13004256

(51) Int. Cl.
  *G01B 3/10* (2006.01)
  *B66B 1/34* (2006.01)
  *H04B 3/54* (2006.01)
  *B66B 7/06* (2006.01)
  *B66B 13/22* (2006.01)
  (Continued)

(52) U.S. Cl.
  CPC ............... *H04B 3/54* (2013.01); *B66B 1/3492* (2013.01); *B66B 7/064* (2013.01); *B66B 13/22* (2013.01); *G01D 5/34746* (2013.01); *H04B 3/60* (2013.01)

(58) Field of Classification Search
  CPC .. B66B 1/3492; B66B 7/064; G01D 5/34746; H04B 3/60

USPC ................. 33/706, 707, 708, 760; 187/394
  See application file for complete search history.

(56) References Cited

U.S. PATENT DOCUMENTS 3,663,881 A    5/1972  Ehrenfried et al.
5,151,562 A *  9/1992  Fujita .................... B66B 1/3492
                                                        187/394

(Continued)

FOREIGN PATENT DOCUMENTS

EP    1 321 423 A1    6/2003
EP    2 067 732 A1    6/2009

(Continued)

OTHER PUBLICATIONS

European Search Report (Application No. 13004256.7) dated Feb. 12, 2014.

*Primary Examiner* — G. Bradley Bennett
(74) *Attorney, Agent, or Firm* — Burr & Brown, PLLC

(57) ABSTRACT

A measurement tape is proposed for determining the position of a cab in an elevator shaft, wherein the measurement tape is situated vertically in the elevator shaft, and extends over at least two floors, and wherein the measurement tape includes a marking unit for marking at least two positions in the elevator shaft, wherein the marking unit runs along the length of the measurement tape. In order to improve servicing, the measurement tape includes a carrier tape and has a transmission device for transmitting information, wherein the transmission device includes at least one communication line for transmitting an information signal and/or at least one supply line for supplying power, and the at least one communication line/supply lines runs along the length of the measurement tape, wherein the communication line is designed as an electrical line for transmitting an electrical signal or as a fiberglass line for transmitting an optical signal.

20 Claims, 20 Drawing Sheets

(51) Int. Cl.
    *G01D 5/347*    (2006.01)
    *H04B 3/60*     (2006.01)

(56) References Cited

U.S. PATENT DOCUMENTS

| | | | | |
|---|---|---|---|---|
| 5,458,216 A * | 10/1995 | Tanaka | ................ | B66B 5/044 187/373 |
| 2004/0094368 A1 | 5/2004 | Birbaumer | | |
| 2008/0202862 A1 * | 8/2008 | Dudde | ................ | B66B 1/3492 187/393 |
| 2012/0118678 A1 * | 5/2012 | Meierhans | ............ | B66B 1/3492 187/394 |
| 2013/0001023 A1 * | 1/2013 | Leutenegger | ........... | B66B 3/023 187/394 |
| 2013/0015022 A1 | 1/2013 | Sonnenmoser et al. | | |
| 2013/0284544 A1 * | 10/2013 | De Coi | ................ | B66B 1/3492 187/394 |
| 2015/0008076 A1 * | 1/2015 | Muller | ................ | G01B 7/003 187/394 |
| 2015/0060210 A1 * | 3/2015 | De Coi | ................ | B66B 1/3492 187/277 |
| 2015/0336768 A1 * | 11/2015 | Otsuka | ................ | B66B 1/36 187/394 |
| 2015/0344266 A1 * | 12/2015 | Inoue | ................ | G01D 5/20 324/207.15 |

FOREIGN PATENT DOCUMENTS

| | | |
|---|---|---|
| EP | 2 546 181 A1 | 1/2013 |
| WO | 03/066496 | 8/2003 |

* cited by examiner

MEASUREMENT TAPE FOR AN ELEVATOR DEVICE

This application claims the benefit under 35 USC §119(a)-(d) of European Application No. 13 004 256.7 filed Aug. 29, 2013, the entirety of which is incorporated herein by reference.

FIELD OF THE INVENTION

The present invention relates to a measurement tape for determining the position of a cab in an elevator shaft, peripheral devices, and an elevator device.

BACKGROUND OF THE INVENTION

Measurement tapes or code tapes are known from the related art, the measurement tapes or code tapes being fitted along the elevator shaft and providing position markings so that the cab can read these position markings by sensor and thereby determine its current position.

SUMMARY OF THE INVENTION

The object of the invention is to be able to provide an elevator device which offers simplified maintenance possibilities.

The measurement tape according to the present invention or else code tape is initially designed to mark the position of the cab in an elevator shaft, wherein the elevator shaft extends over at least two floors. With respect to its length, the measurement tape is designed in such a way that it extends at least over two floors, and therefore the cab can determine its position using the measurement tape at each floor; to this end, the measurement tape has a marking unit for marking at least two positions in the elevator shaft, and therefore the cab can determine its current location on the basis of these markings by sensor. The marking unit runs along the length of the measurement tape, that is to say it extends at least over significant portions of the measurement tape.

Accordingly, the measurement tape according to the present invention is distinguished in that a transmission device for transmitting information including at least one communication line for transmitting a signal is provided, and the communication line runs along the length of the measurement tape. The signal can be, in particular, a carrier of information. The measurement tape according to the invention therefore includes a communication line which extends over the entire length of the measurement tape or at least over wide portions of the length of the measurement tape, and therefore the communication line is also carried along from floor to floor. In order that the cab can clearly read the measurement tape, the measurement tape is generally fitted at a point which is exposed with respect to the cab. Owing to the measure, according to the invention, of fitting the communication line directly to the measurement tape or integrating the communication line in the measurement tape, the communication line is advantageously particularly easily accessible and may also be tapped off or contacted at virtually any point in the elevator shaft in a simple manner. In particular, communication from floor to floor is consequently possible as a result of this.

A very large number of electrical and electronic devices, which can accordingly be supplied with power via supply cables and can be controlled via control cables or forward data via cables, are usually provided in connection with elevator devices. The devices are operator control electronics, sensors, monitoring electronics including climate-control devices, lighting devices etc.

However, the lines of safety devices are of particular importance since they ensure safe operation of the elevator and safety of people. The safety devices are used, for example, in connection with the door sensor system, in order to prevent a person being caught in a closing door. Furthermore, the drive of the cab has to be controllable, so that it is not possible for the elevator to move away when doors are open, for example. The elevator and, in particular, its safety devices therefore have to be continuously controlled, serviced and maintained in a particular manner. In order to be able to carry out this servicing in a simple and rapid manner and therefore without a high level of costs, the corresponding communication lines on the measurement tape according to the present invention can be made easily accessible. Complicated searching for the corresponding lines in a cable shaft is therefore not necessary. On account of the fact that the measurement tape according to the invention can also be routed along the individual floors, simple access from each floor can also be achieved, and therefore this improved access considerably simplifies the servicing options. In addition, a line of this kind can be simply retrofitted and newly used in an existing elevator shaft by replacing a commercially available measurement tape with a measurement tape according to the invention.

The communication line can be designed as an electrical line or else for transmitting optical signals, for example as a fiberglass line.

In addition to the actual communication line, the transmission device can additionally also have at least one supply line for supplying power, wherein the supply line can then be arranged, in particular, parallel to the at least one communication line. Simplified access to the corresponding supply lines is also advantageously ensured as a result.

Specifically, in the case of newly built houses, the effect of the structure "settling" over time generally occurs, that is to say the building becomes somewhat compressed over time owing to material loading, changes in the construction substance, etc. In order to be able to take into account this structural effect from the start when installing an elevator in a building, position markings, for example, can be fitted to the elevator frame on which the cab is movably supported, since the frame is at least not directly affected by the process of "settling" of the building; in this case, the position of the markings relative to the elevator does not change. However, a procedure of this kind can entail the problem of the markings on the frame no longer corresponding to the actual positions of the individual floors in the building as soon as the building has settled.

If, however, the measurement tape is not fixed to the frame, but rather in the elevator shaft, specifically in such a way that it is fixedly connected to the elevator shaft continuously or at least at several points, the measurement tape can bend, deform or at least be subject to stress when the building settles. The measurement tape may be damaged as a result. In addition, a bent measurement tape marks the position of the cab in an inaccurate manner at the corresponding points and possibly may be unreadable. It is therefore advantageous to support the measurement tape in a movable manner and, in one variant embodiment of the invention, in particular to suspend the measurement tape from the ceiling of the building. As the building settles, the measurement tape, which is suspended from the ceiling, will likewise move. Since the measurement tape is in turn supported only such that it can move along the elevator shaft but is not fixed at individual points, it can move with the elevator shaft without becoming bent. The position can then still be exactly read. Comparison of the time profile of the relative positions of the measurement tape in comparison to its supporting devices can be used to determine the extent to which the building has settled.

A mounting device can additionally also be provided in the lower region of the measurement tape, the mounting device allowing the measurement tape to be supported, preferably movably supported, so that the measurement tape is not subject to stresses and bending even as the building settles.

Particularly when the measurement tape is suspended in the elevator shaft, the measurement tape experiences a high level of mechanical loading, in particular owing to its inherent weight, over its length. Further mechanical loading occurs as a result of the measurement tape being comparatively freely accessible and therefore also being exposed to wind flows in the elevator shaft and also flows which are caused by the movement of the cab. It should be noted that the cab travels through the shaft partly at a relatively high speed. Furthermore, it should be noted that the cab already takes up a large portion of the elevator shaft. Consequently, the cab moves a large mass of air with it, the large mass of air being pushed in front of the cab as the cab moves. This also leads to swirling air which acts on the measurement tape. On account of this, it may be advantageous in one exemplary embodiment of the present invention not only for the measurement tape to be composed of electrical lines and position markings, but, for stability regions, also for a carrier tape which increases the stability of the measurement tape to be provided. A carrier tape of this kind can be produced, for example, from steel. Otherwise, there would be a risk of air swirling around the measurement tape to an excessive extent and of damage occurring.

For the same reasons, the measurement tape can also be designed as a composite tape comprising at least two composite layers in an advantageous manner in a development of the invention. In addition, insulation layers or shielding layers can also be used as composite layers, the insulation layers or shielding layers therefore ensuring that signal transmission proceeds without interference. However, it is feasible, in particular in one exemplary embodiment of the invention, to design the measurement tape at least partially in a carbon-fiber-reinforced and/or fiberglass-reinforced manner, so that it becomes more stable overall. Reinforcements of this kind can therefore ensure, for example, that the measurement tape does not stretch to an excessive extent owing to its inherent weight. This would firstly result in the markings being distorted over time and the position information relating to the total length changing ever more greatly and becoming faulty. However, stretching on account of the inherent weight would also result in, for example, an increased tensile loading on the lines or on individual layers of the measurement tape, so that the extension of the tape, fractures, cracks, shearing etc. would not be precluded.

However, reinforcement of the measurement tape in one embodiment of the invention also has the advantage that it can be incorporated such that a certain torsional stiffness can be achieved and the measurement tape cannot be either twisted nor sheared owing to air flows or the like. Therefore, the measurement tape can remain in good condition and be used for longer.

In one advantageous variant embodiment of the invention, the marking unit is fitted to a side of the carrier tape on which the marking unit can be read by the cab. Therefore, the side which is provided with the marking may advantageously be that side of the carrier tape which faces the cab. The transmission device can then be arranged on the opposite side of the carrier tape. This arrangement is also advantageous for stability reasons because the tape can therefore be subjected to equal loading on both sides. Furthermore, the lines of the transmission device are then arranged on that side which is averted from the cab and therefore are not directly exposed to the movement of the cab and the associated mechanical loading. Therefore, damage can also be reduced owing to this measure.

In a development of the invention, the marking unit can be designed as a reflector layer, with the markings being provided as an imprint or coating on the reflector layer. This allows the greatest possible contrast between the marking and the rest of the tape. A high contrast between the "lines" or "fields" and the "light regions" which are located between them is therefore possible particularly when the marking is in the form of a barcode (one-dimensional barcode or 2-D code). The coating or the imprint can therefore be designed to be, for example, black. In order to achieve as high a contrast as possible, the imprint or the coating can absorb the corresponding light to the greatest possible extent. Infrared light is generally used. However, it is also feasible to use visible light (wavelength: approximately 400 nm to 800 nm). The reflector layer can also be designed in a different way. The reflector layer may be a plastic layer which is composed of polyester or polycarbonate. In order to be able to reflect back the light as effectively as possible, a reflecting structure or coating can be formed on that side which is averted from the cab. This allows the marking to be read in as reliable a manner as possible and therefore fewer faults occur in the operating procedure of the elevator.

In order to be able to effectively protect the communication lines, the lines can be embedded in an insulation layer which is arranged on one side of the carrier tape in one embodiment of the invention. The lines are then completely enclosed and cannot come into contact with, in particular mechanically moving, parts. The safety and reliability can be improved as a result.

In the upper and lower region of the measurement tape, that is to say in particular where the measurement tape is fixed or movably supported on the elevator shaft, connection contacts for making contact, primarily for feeding and/or tapping off the transmitted electrical signal, can be provided at or on the communication line. A voltage can also be applied to the lines in the measurement tape at the connection contacts. In order that tapping is possible not only at one of the ends of the measurement tape, but rather also at other points in between, at least one additional contact for making contact, feeding or tapping off the transmitted electrical signal can be provided between the upper and lower mounting device or between the contact connections fitted there. The signal or the voltage can therefore be tapped off at any point between the upper and lower end of the measurement tape. As a result, it is possible for this information, the voltage etc., to be available throughout the elevator shaft. In particular, an additional contact of this kind can be provided on individual floors, so that the measurement tape can be accessed at the corresponding points in as simple a manner as possible.

A connection or additional contact may already be premounted with the measurement tape, so that it is always available when required. In particular, it is therefore feasible to attach these additional contacts to the measurement tape at regular intervals, so that as flexible a use as possible of the measurement tape can be achieved according to this embodiment of the invention. It is therefore also possible to provide additional contacts not only on each floor or at the level of each floor, but also to a certain extent in any desired number and in any desired concentration.

Additional contacts can advantageously be designed as plug receptacles or as female plug connections, so that contact with the lines is not established even in the event of accidental contact, but only a suitable plug has to be provided in order to establish contact. In addition, for safety reasons, a removable or fold-open cover of the additional contact can be provided. Therefore, additional contacts of this kind in general constitute a particularly safe and also easily accessible "plug and play" connection.

If optical lines such as glass fibers are used, optical devices for coupling in and coupling out light, instead of the electrical contacts, can also be used as connection contacts or additional contacts.

The used lines, supply lines and communication lines may have various designs according to the present invention, for example, a wire, an imprinted conducting path, an adhesively bonded conducting path or a conducting path on a flexible printed circuit. It is also possible to provide more than one of these designs within a single measurement tape. For example, it is feasible to design supply lines or particularly important lines as wires, while other, more secondary lines are designed as conducting paths in order to be able to save weight and particularly space. It may also be particularly advantageous to design ground cables as wires, in order to achieve stable grounding and, at the same time, a large shielding option for other, adjacent lines.

On account of their flat design, conducting paths are initially easier to separate and therefore more susceptible to mechanical destruction. If, however, the conducting paths are imprinted, for example onto a flexible plate material, mechanical fracture can be avoided. Furthermore, flat contacts can also be effectively realized using conducting paths.

In order that an electrical signal can propagate through the line without interference or influence and also itself cannot interfere with other lines and the signals transmitted in the lines, at least one of the communication lines or supply lines can be shielded, wherein, in particular, at least one ground line can be used for shielding purposes. In particular, at least two of the contact lines or supply lines can therefore be shielded from one another.

In principle, the communication lines, supply lines and ground lines can be arranged in parallel along the measurement tape. In one development of the invention, it is possible to depart from a parallel arrangement of the lines as a shield. In this case, two lines, two contact lines or two supply lines, one contact line and one supply line, or else one contact line or one supply line can be twisted with a ground line. This way of shielding is particularly effective and can, furthermore, lead to increased stability since the lines which are twisted together have an additional area of play for movement in respect of stretching and mechanical movements. Similarly, it is feasible to arrange conducting paths one above the other in a meandering manner and therefore to achieve a shielding effect similar to twisting of wires.

The individual lines which are routed in the transmission device can include, in particular, two supply lines and two lines for data transmission. It is also feasible to design an individual line as a communication bus, wherein all types of bus can be used in principle, that is to say, for example, including a CAN bus or RS-485. The communication lines can transmit data in a unidirectional or else bidirectional manner.

A particularly advantageous option is to use the carrier tape as a shield. Particularly when the carrier tape is designed from metal, it provides a shield of large surface area which may be sufficient for all of the lines (at least on one side). A carrier tape which, for stability reasons, is designed to be thick in any case amplifies the shielding effect. The carrier tape can be grounded for shielding purposes.

There are, in principle, two advantageous embodiments for being able to ensure good grounding of the measurement tape. Firstly, the grounding can be performed at precisely one point on the measurement tape, in particular in the region of the upper suspension where the measurement tape is fixedly connected to the building or to the elevator shaft in any case. This measure initially has the advantage that less compensation currents can flow between different grounding points. If, specifically, a second grounding is provided comparatively far away, compensation currents may occur between these two points which can in turn influence the signal line.

However, grounding solely at one point is generally not sufficient: if no further grounding is otherwise performed, the long measurement tape can act like an antenna and capture, in particular, radiofrequency electromagnetic signals. In order to avoid the effect of an antenna, the measurement tape can be connected to ground by means of a capacitor, a so-called anti-interference capacitor, at the other end of the measurement tape, that is to say at the lower end in the present embodiment. The capacitor then acts like a bypass for dissipating radiofrequency oscillations. A further advantageous option is that of establishing several contacts to ground, the distance between the individual connections not being selected to be excessively large however, that is to say for example at the level of the individual floors. Compensation currents are then negligibly low and do not influence the signal line.

In order to avoid additional interference, galvanic isolation can, in particular, be provided between the contact lines and the electronic system which can be connected.

In order to achieve particularly effective shielding of the measurement tape, it is possible to arrange a shielding cage around the measurement tape. The cage can be grounded and therefore act like a Faraday cage which therefore also surrounds the transmission device and keeps the signal line free of external influences where possible. A shielding cage of this kind may be a particularly advantageous shield which is very effective.

In principle, it is also feasible to use an electrostrictive material in one embodiment of the invention, so that the measurement tape changes in length when a specific voltage is applied. This embodiment can be used, in particular, in order to provide compensation in the event of a change in length, for example as a result of the inherent weight.

The measurement tape can be used in connection with several devices or peripheral devices of the elevator device, such as the position determination device, a safety device or a communication device for example.

Therefore, a position determination device according to the invention is distinguished, in particular, in that a corresponding measurement tape is used for markings for position determination.

The communication and supply lines can be used in connection with a safety device. The safety devices monitor individual sensors and switches and can therefore also act on the drive of the cab and control the drive. The cab can be moved, for example, only when all doors are correctly closed, that is to say both the shaft doors which are fitted to the shaft itself and the cab doors of the cab which are located on the cab. This information, as to whether all doors are closed for example, can be transmitted by means of the measurement tape and made available at each floor. Data relating to individual floors can also be fed into the lines, for example whether a specific shaft door is correctly closed and there is therefore no danger.

In one development of the invention, a safety device according to the invention can additionally provide a testing device for testing the measurement tape for fractures or stretching phenomena, by, for example, a runtime measurement of a signal through lines of the measurement tape being carried out or a capacitance measurement of the measurement tape being performed or a simple continuity test for various lines being carried out. Safety can be increased as a result, but it is also possible to be able to improve maintenance and servicing since corresponding faults can be tested for in an automated manner.

In particular, connections within a line, for example to individual floors, can also be tested and, to this end, a connection testing device may be provided in one embodiment of the invention. In addition, safety can be increased and servicing can be improved as a result.

Furthermore, a communication device according to the invention can be used in connection with a measurement tape of this kind since communication can take place, in particular between individual floors, in an advantageous manner by means of a measurement tape of this kind.

Accordingly, exemplary embodiments of this kind of a position determination device according to the invention, a safety device or a communication device can advantageously be used in an elevator device according to the invention, wherein all of the described advantages of the measurement tape in this device can be used there.

BRIEF DESCRIPTION OF THE DRAWINGS

Exemplary embodiments of the present invention are represented in the drawings. Both the measurement tape and corresponding connecting devices are depicted. They are explained in greater detail, specifying additional details and advantages.

DETAILED DESCRIPTION OF THE INVENTION

Figure 1:
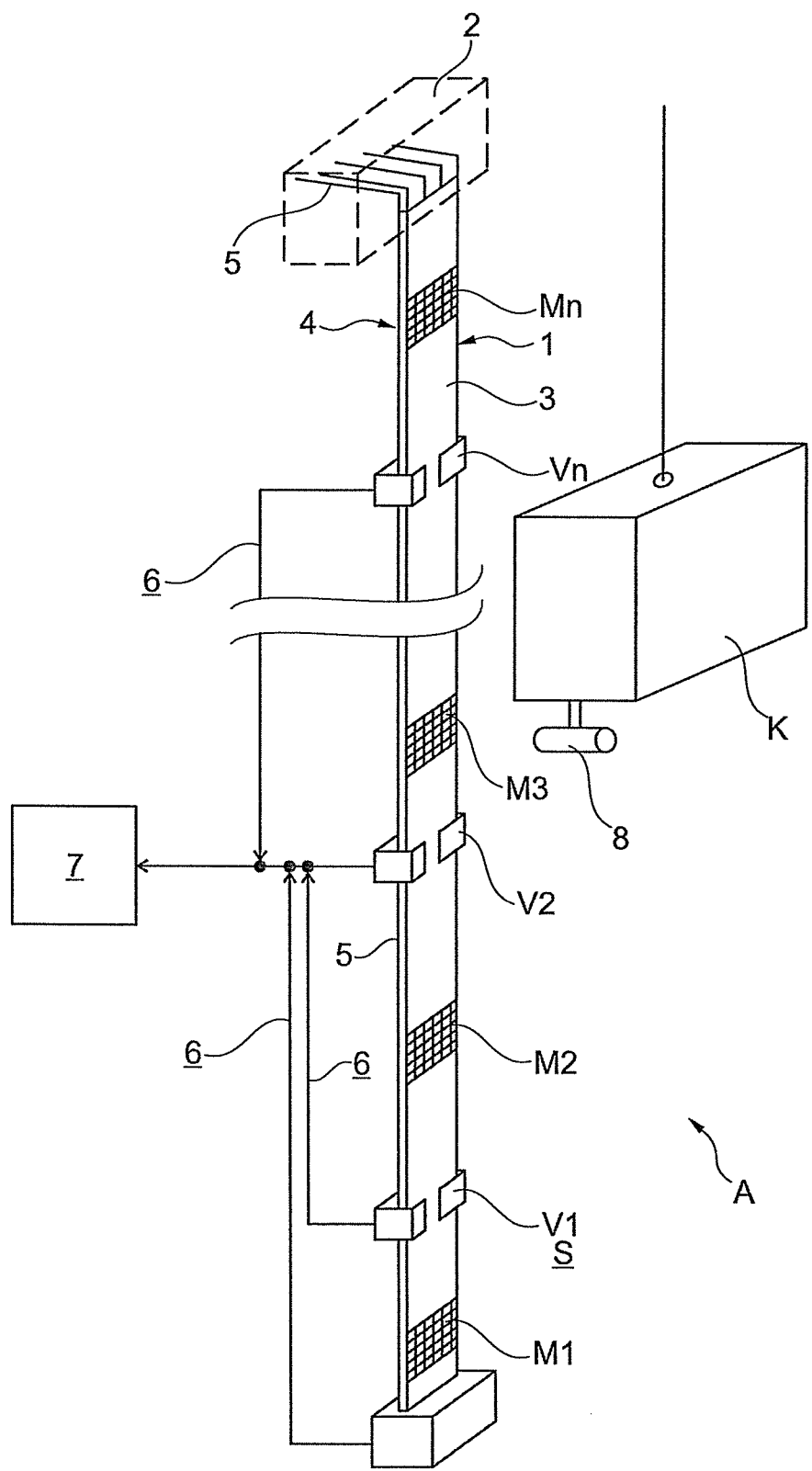
FIG. 1 shows a schematic representation of an elevator shaft having a measurement tape.

FIG. 1 shows an elevator device A having an elevator shaft S, in which a cab K is movably supported. A measurement tape 1 is situated in a suspended manner along the elevator shaft. The measurement tape 1 is fixed only at its upper end via an installation device 2. A marking unit having multiple markings M1, M2, M3, Mn is situated on the front side 3 facing the cab K. A reflective layer is situated on the front area 3 of the measurement tape 1 which extends longitudinally across the entire measurement tape 1. The markings M1, M2, M3, Mn are designed as imprinted 2D codes.

The markings M1, M2, M3, Mn are encrypted, so that a position determination device requires the specific key for decrypting/decoding these sensor-detected markings in order to be able to obtain this encoded data. In the present case, the position of the corresponding elevator cab K in the shaft S is marked via the markings M1, M2, M3, Mn. If the cab K is situated at a corresponding position and its sensor reads out, for example, the marking M2, the encoded position information on the marking M2 thus corresponds to the current position of the elevator cab K.

Communication lines 5 are situated on the rear side, i.e., the side 4 of the measurement tape 1 facing away from the cab K, via which information may be transmitted. These communication lines 5 run along the entire length of the measurement tape 1 from the top to the bottom. Connecting devices V1, V2, Vn are also situated at the level of the individual floors, i.e., one of these connecting devices V1, V2, Vn is situated at each floor. The markings M1, M2, M3, Mn do not have to be situated spaced apart from each other; rather, it is also conceivable for each marking to follow the preceding one directly. In fact, it may be advantageous to arrange the markings 'continuously' over the length of the shaft S or over the length of the measurement tape 1, so that the current position may be read out at each position.

In addition, it is conceivable that certain positions in the shaft are separately marked or encoded. For example, so-called 'safety zones' exist around each floor entry in the shaft or around each shaft opening. If the elevator must stop within one of these safety zones, for example, in an emergency, the doors may thus be opened even though the cab is not situated in the specified exit position of a floor (for example, with the cab floor flush with the shaft opening). In this emergency situation, an exit in the safety zone is possible and must therefore unconditionally be allowed by the safety device of the elevator, for example, by allowing the doors of the cab to be unlocked.

The connecting elements V1, V2, Vn have contacting elements to the communication lines 5. Lines 6 are continued to an electronics unit 7 via these contacting elements. In the present case, the electronics unit 7 is a safety device which, for example, monitors whether the elevator doors, for example, the shaft doors which are attached to the elevator shaft S or the cab doors on the cab K, are properly closed during travel or are open when exiting, or whether there is a malfunction caused, for example, by blockage of a door.

An optical sensor 8 is situated on the cab K, which is used for reading out the markings M1, M2, M3, Mn and which passes the obtained data to a position determination device.

Figure 2:
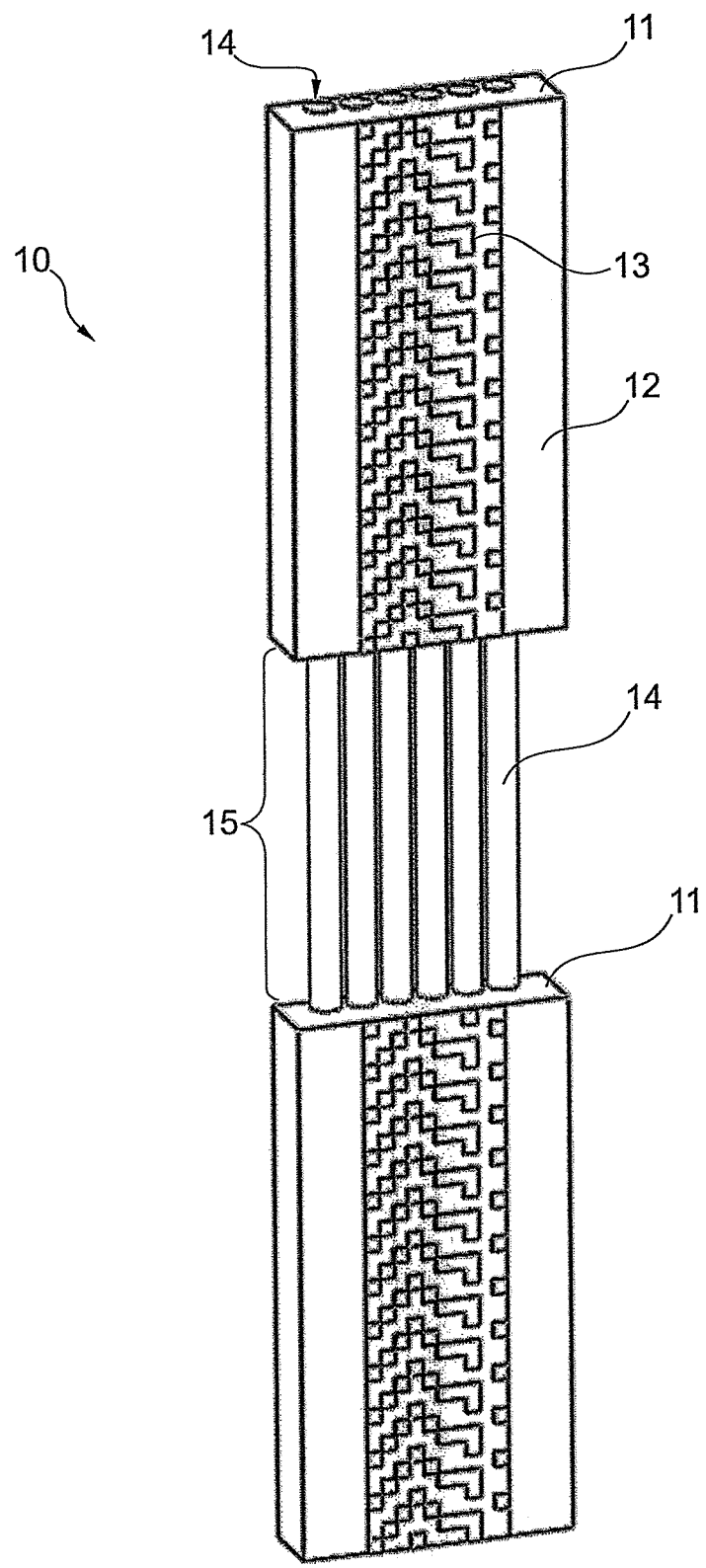
FIG. 2 shows a measurement tape having lines.

FIG. 2 shows a schematic representation of a measurement tape 10 having a carrier tape 11. The two side edges on the front side on the measurement tape 10 are left free, while a marking strip 13, which comprises a reflective layer having a 2D code imprinted on it as a marking, is attached in the center. The carrier tape 11 itself is designed as a steel tape. Communication lines 14 are embedded in the carrier tape 11 which are made up of electrically conducting wires which, however, are insulated with respect to the steel tape. In the specific embodiment according to FIG. 2, they run in parallel. For purposes of clarity, the lines 14 are illustrated without the carrier tape in the area 15. The side area 12 is therefore left free so that it may be partially enveloped there by the support without the marking strip 13 being covered. In order to be able to read out the markings or the 2D code 13, a corresponding encoding key must be stored in the position determination device.

Figure 3:
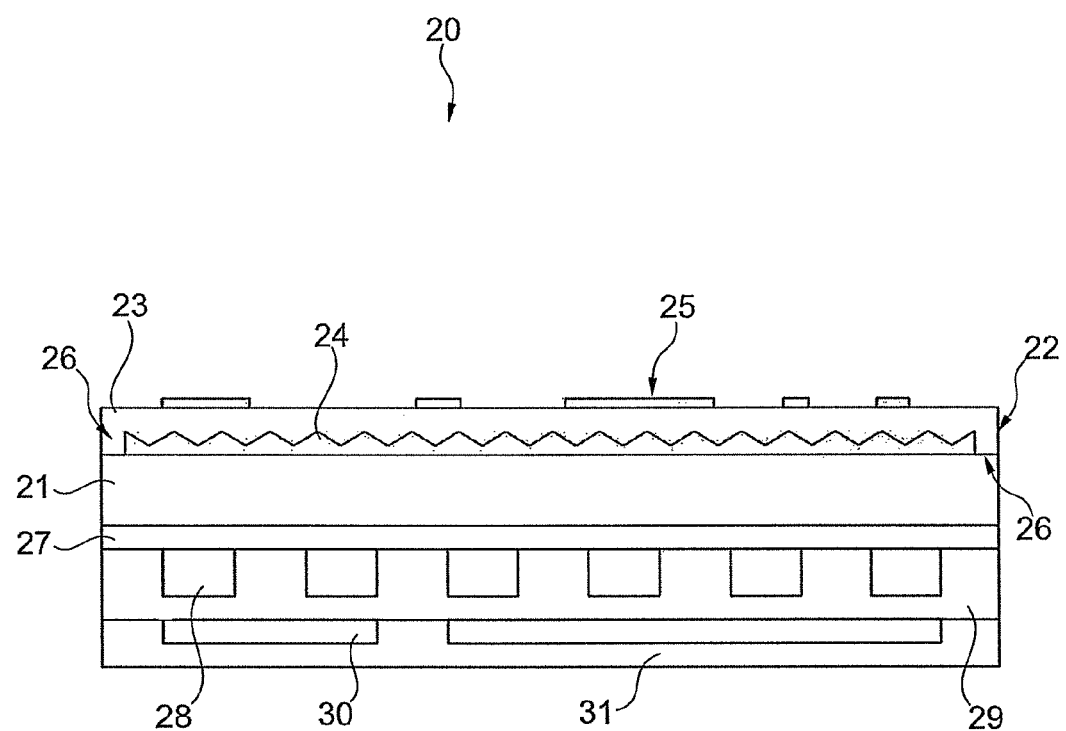
FIG. 3 shows a cross section of a measurement tape.

FIG. 3 shows a detailed representation of a structure of such a measurement tape 20. This tape 20 has a carrier tape 21 which is formed from steel as a basic component. The marking 22 is situated on the upper side of the carrier tape 21 in FIG. 3, which in turn initially has a transparent plastic layer 23 on the surface. A kind of air cushion 24 is situated between the major portion of the plastic layer 23 and the carrier tape 21. The plastic layer 23, which is generally made of polyester or polycarbonate, is formed in a serrated manner toward the air cushion 24. Code imprints 25 for encoding position information are in turn situated on the outer surface of the plastic layer 23. The plastic layer 23 is attached to the carrier tape 21 in the edge area 26. The air cushion 24 is necessary in order for light, for example, from an optical sensor of the elevator cab which passes through the transparent plastic 23, to be reflected back at the serrated border surface between the plastic layer 23 and the air cushion 24. On the other hand, if the light falls on a code impression 25, it is largely absorbed. In this way, the code is read out and recorded.

An insulating layer 27 is initially situated on the other side of the carrier. Copper or aluminum lines 28 are located directly at this insulating layer 27. These lines 28 are in turn covered by an insulator 29. The line 28 is thus embedded between insulators 27, 29. Imprinted conducting paths 30 are in turn situated on the insulator 29, which in turn is covered by an insulating layer 31. The measurement tape thus includes a reflection strip on its marking side, only some areas which display an encoding being covered by black areas (imprinting) for marking. It may be advantageous to provide only one center strip with the markings on the marking side of the measurement tape along the length of the measurement tape and to leave the side areas at least partially free. This measure is advantageous because the measurement tape is for the most part not rigidly fixed at regular intervals, but is suspended in the upper area of the shaft and is otherwise movably supported. This support may advantageously be carried out by a partial enclosure, so that the code tape is enveloped at the edges; however, the enclosure does not completely surround the measurement tape, but leaves an open gap. For reasons of symmetry, this gap may therefore lie in the center of the measurement tape.

When new buildings are built, the effect of 'settling' becomes noticeable over time, i.e., their height decreases slightly over time. If the measurement tape were fixed at regular intervals, it would bulge out in a wavelike manner if the height of the building is decreased or compressed. However, if the measurement tape is movably supported, it is able to move within the supports, and the support does not have to be opened, and the measurement tape also does not have to be readjusted. The predefined edge areas may, for example, be used for individual markings, for example, for marking safety zones, around each floor exit, particularly as, in this case, no continuous, unbroken marking is required, which could be covered by a support.

The reflection may be achieved using rear reflectors in the reflection tape, for example, also via small specular spheres or via the arrangement of prisms. The attachment of curved mirrors is also generally possible.

The carrier material 21, which is formed mainly from steel, ensures high mechanical stability on the one hand. In addition, it may also be glass-fiber-reinforced or carbon-fiber-reinforced. This reinforcement is in particular advantageous because the very long measurement tape may also have a non-negligible weight and may therefore also stretch once more over time. This stretching of the measurement tape may thereby be reduced. On the whole, however, the measurement tape must in any case be able to withstand several loads in the elevator shaft S; in particular, on the one hand, the temperatures and temperature differences prevailing there, the humidity, the dust, corrosion, particularly due to humidity, mechanical abrasions, and wind. The individual layers, imprints, and so forth may be attached together in a wide variety of ways, for example, by laminating, gluing, soldering, welding, or by other methods for forming a connection. In particular, layers or markings may also be imprinted.

Figure 4:
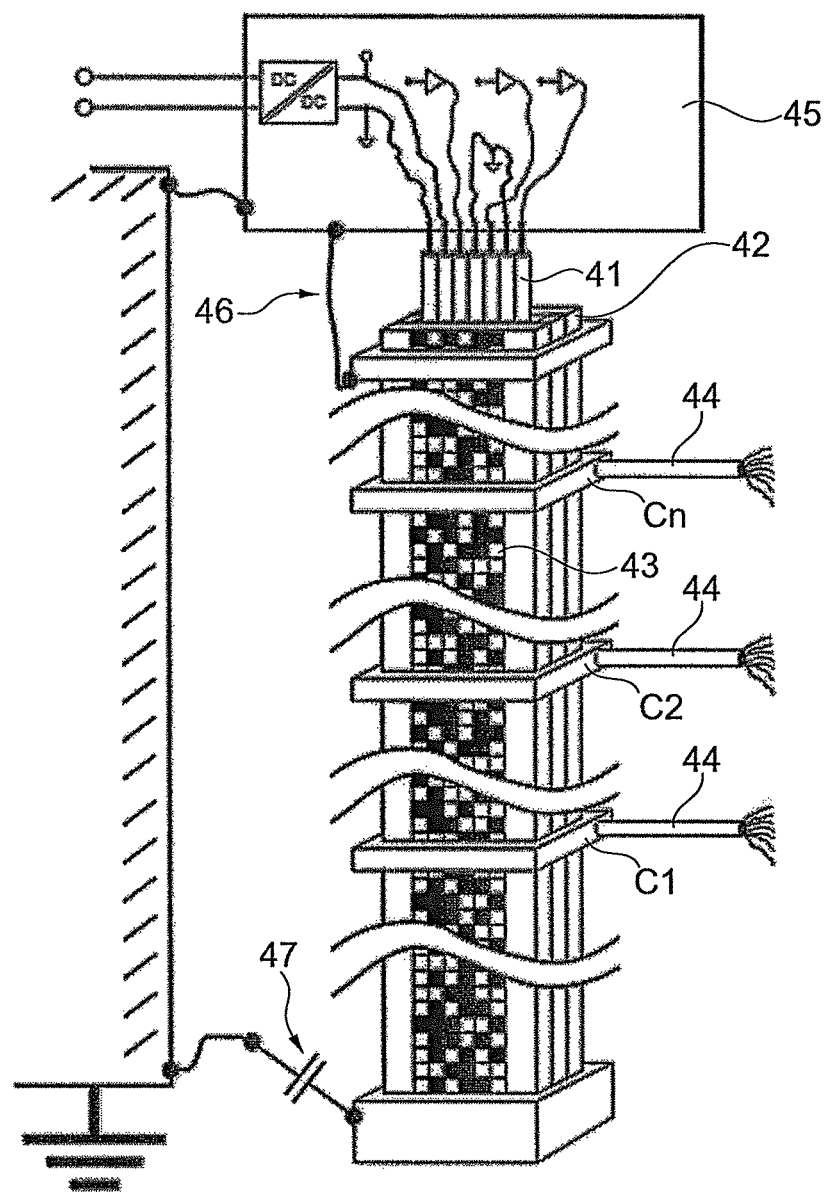
FIG. 4 shows a measurement tape having ground terminals and an anti-interference capacitor.
Figure 5:
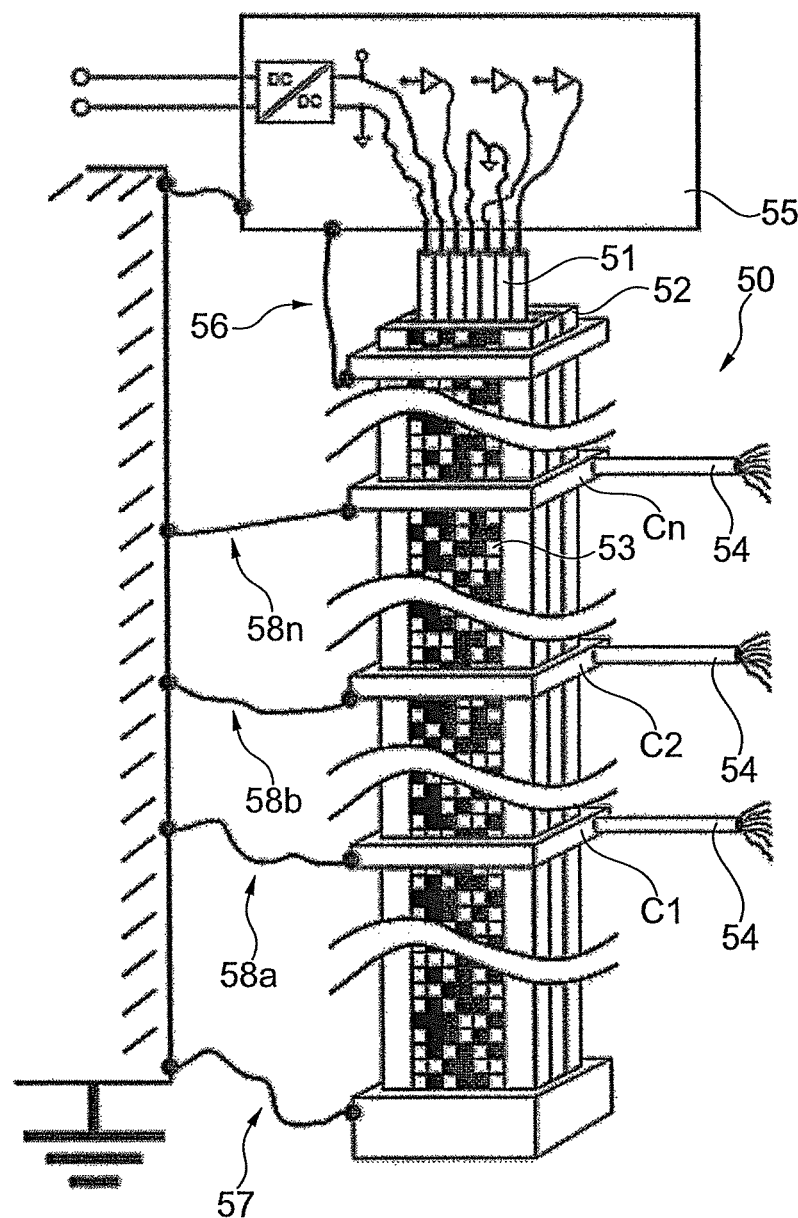
FIG. 5 shows a measurement tape having ground connections.

FIGS. 4 and 5 show options for establishing grounding or producing shielding. FIG. 4 shows a schematic representation of a measurement tape 40 having communication lines 41. A metal cage 42 is situated in the outer area, which encloses the measurement tape along with its lines 41. In addition, a marking strip 43 is provided. A connection clip C1, C2, Cn is situated at the level of each individual floor, which simultaneously provides contacting elements to the lines 41, so that corresponding connection lines 44 may each be routed from the clips C1, C2, Cn. The communication lines 41 may be arranged in parallel or twisted in pairs in order to achieve shielding. In the case of lines arranged in pairs, a ground cable is situated between each of the individual communication lines. The communication lines are in turn galvanically isolated from the electronics with which they are connected via the line 44. The communication lines 41 are also connected to other electronics in the upper area of the elevator shaft via galvanic isolation 45. The metal cage is grounded at the upper end of the measurement tape via a ground line 46. The metal cage is connected to ground in the lower area via a capacitor 47. The capacitor 47 is also referred to as an anti-interference capacitor. This capacitor 47 constitutes a kind of bypass for discharging high-frequency oscillations, since the measurement tape 40 could act as an antenna without an anti-interference capacitor.

FIG. 5 shows a similar measurement tape 50 having communication lines 51, a metal cage 52, and individual clips C1, C2, and Cn for contacting the lines 51. Furthermore, a continuous marking 53 is attached in the outer area along the length of the measurement tape 50. The contacted lines 51 are routed outwardly via cables 54 and connected to additional electronics via the clips C1, C2, Cn. The lines 51 may also be arranged in parallel with ground cables between them for shielding or else twisted in pairs so that no internal crosstalk results; i.e., the lines do not mutually influence one another when conducting signals. In the upper area, the communication lines 51 are in turn connected via galvanic isolation 55 to additional electronics and to a voltage source if lines for supplying power are provided within the lines 51.

In the present case according to FIG. 5, a ground of the outer metal cage 52 is provided via a ground connection 56 not only at the upper end of the measurement tape 50, but also in the end area among other places, in particular via the line 57. Anti-interference capacitors are not provided. However, in order that no transient currents flow because the ground is attached at different locations of the measurement tape, which in turn are far apart, a ground is provided at each clip C1, C2, Cn at the level of each floor via the corresponding lines 58*a*, 58*b*, 58*n*.

Figure 6:
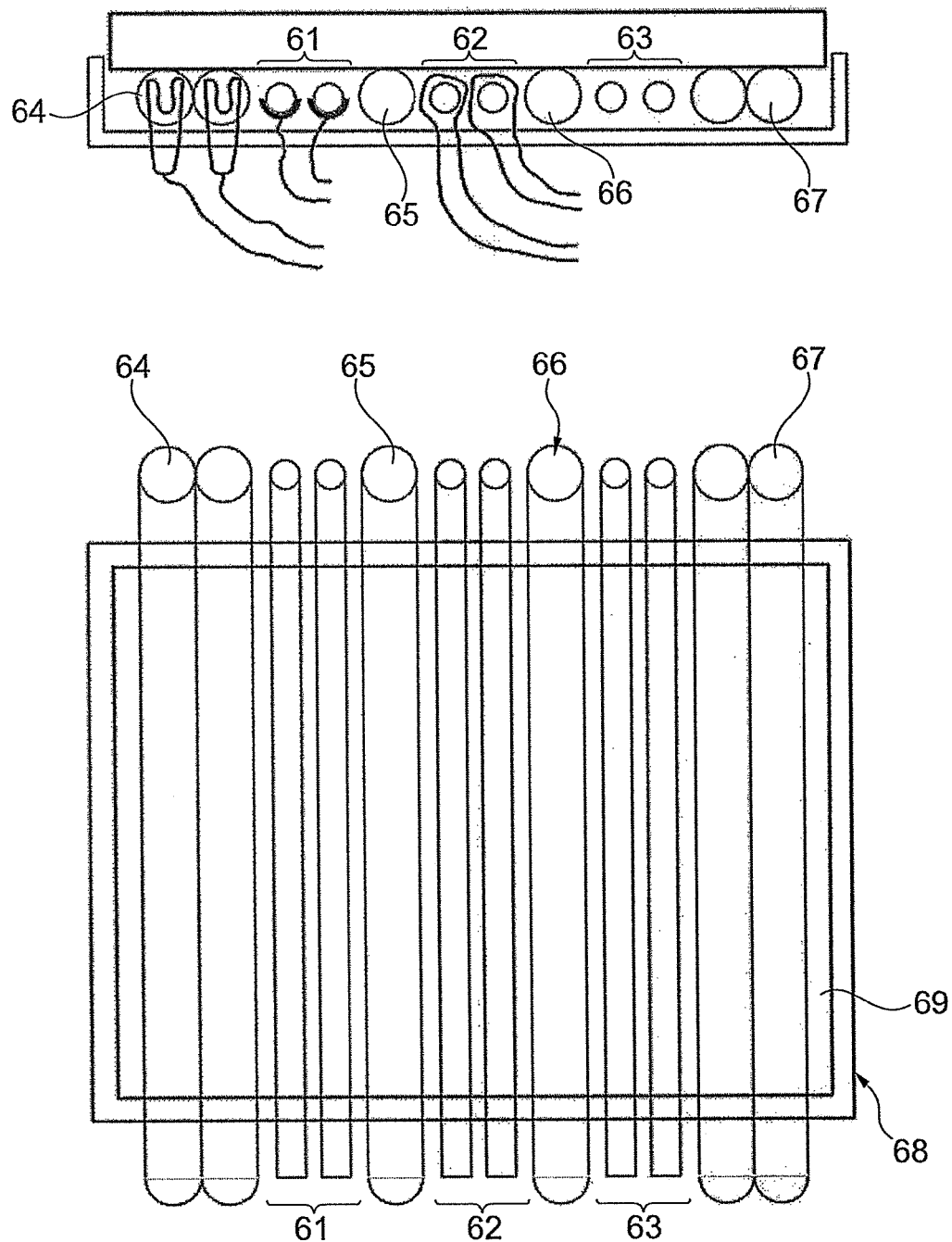
FIG. 6 shows a parallel line routing in the measurement tape.

FIG. 6 shows multiple communication line cables and current conduction cable pairs 61, 62, 63, which are situated in parallel along the length of the measurement tape and are shielded from each other by ground cables 64, 65, 66, 67. In addition, a cover 68 is attached above the individual cables, which may also be metallic and is connected to ground in order to achieve shielding. A slot 69 is situated at one position in this cover 68, in the area of which contacting or access is thus directly possible.

Figure 7:
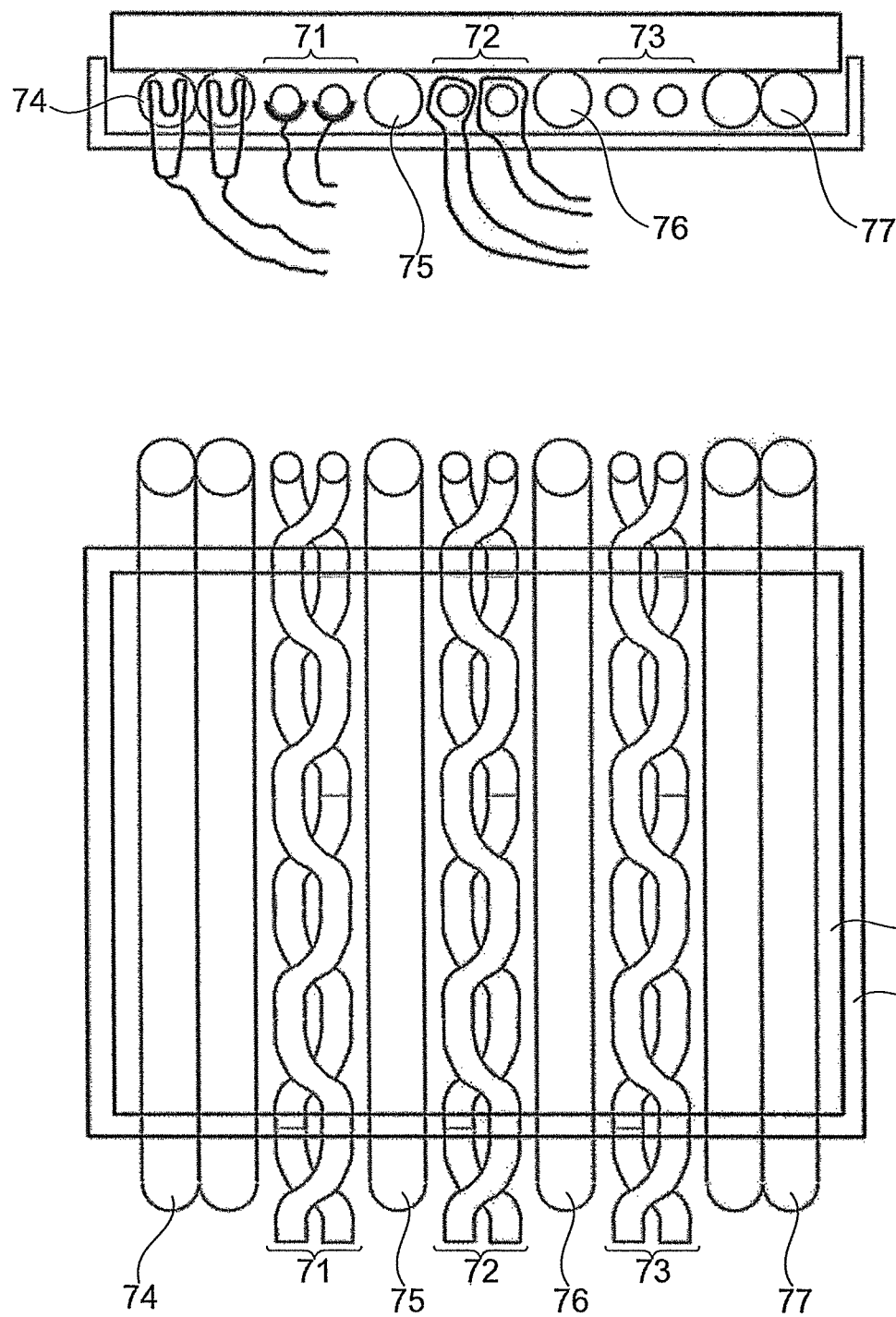
FIG. 7 shows a twisted line routing.

FIG. 7 shows a similar arrangement of cable pairs 71, 72, 73, wherein the respective pairs 71, 72, 73 are twisted together, thereby achieving shielding. In addition, ground cables 74, 75, 76, 77 are situated between the individual pairs 71, 72, 73. A grounded cover 78 is also situated over the cables having an opening 79 via which contacting may take place.

Figure 8B:
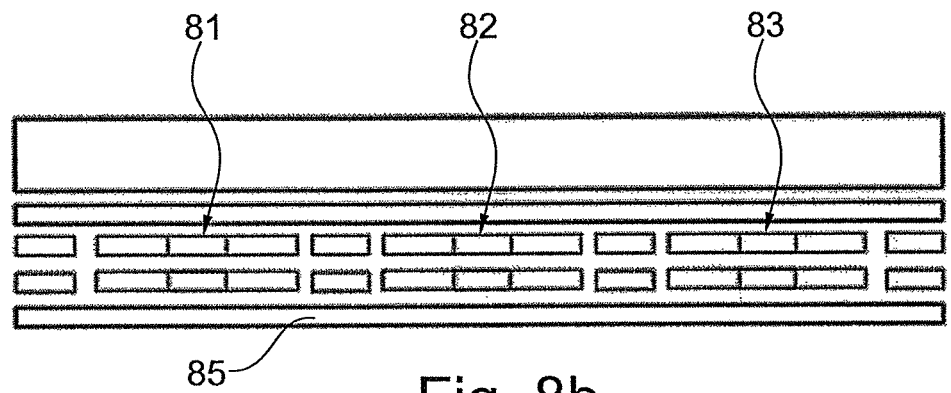
FIG. 8b shows meandering conducting paths (top view)
Figure 8A:
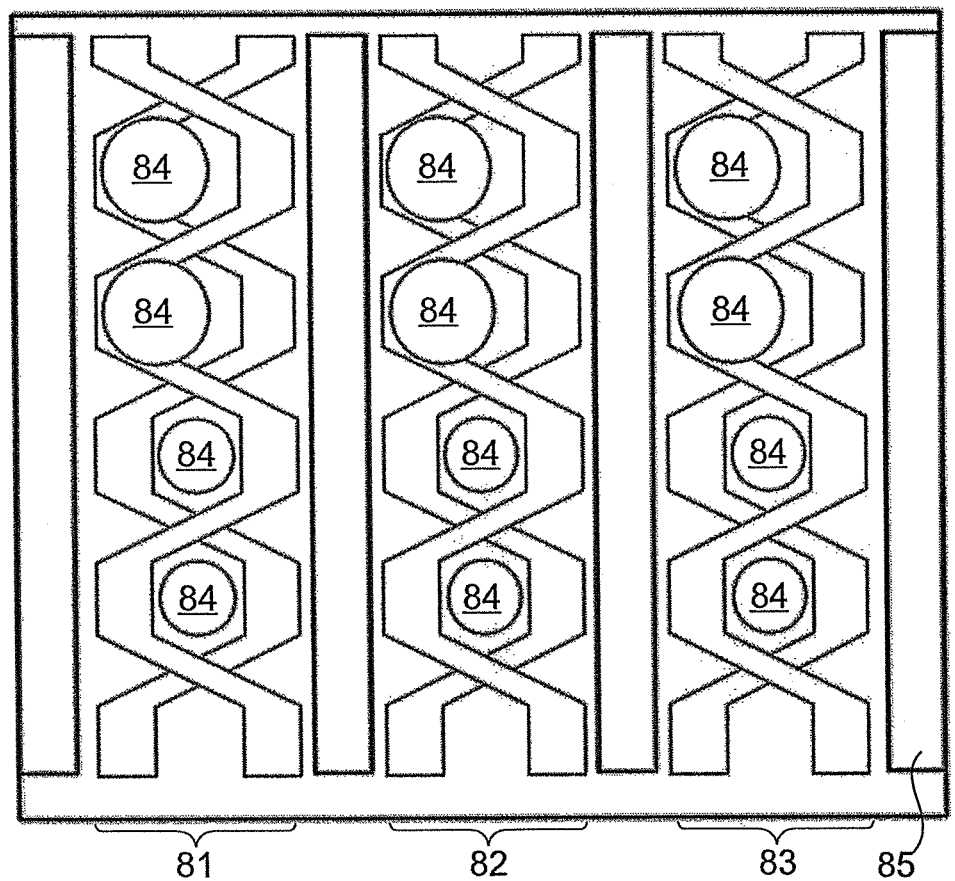
FIG. 8a shows meandering conducting paths.

FIGS. 8*a* and 8*b* also show line pairs 81, 82, 83 which are formed (for example, imprinted) as conducting paths. Similarly to a twisted arrangement according to FIG. 7, these conducting paths 81, 82, 83 are arranged in a meandering manner. The conducting paths may be printed in such a way that they cross each other in a meandering manner. Different conducting paths may be situated directly side by side or lie one above the other in different layers. The twisting of conducting paths may be carried out in such a way that, in the case of three conducting paths, they are twisted together similarly to a braid, so that two different conducting paths demonstrate a kind of outward bulge in the longitudinal direction, and a contacting option 84 (to the central conducting path) is created in the center. The conducting paths may in turn be surrounded and shielded by a grounded cage 85 in the outer area. FIG. 8*b* shows a similar representation of a cross section of a corresponding measurement tape, in a top view.

The corresponding conducting paths may generally be contacted via so-called 'VIAs'.

Figure 9:
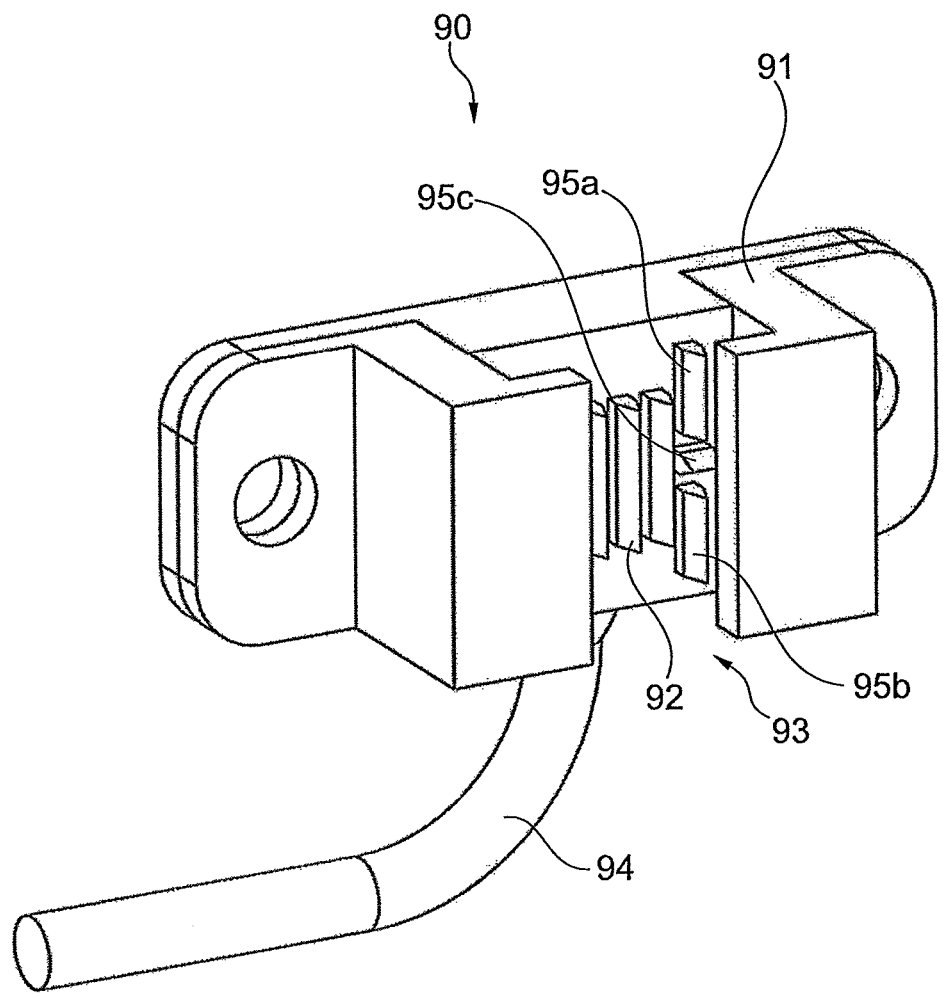
FIG. 9 shows a connecting device having an interruption contact.

FIG. 9 shows a connecting device 90 having an outer bracket device 91 which is able to be screwed onto the shaft wall, which is able to engage partially around the measurement tape, and furthermore having contacting electrodes 92 which are formed as piercing contacts. The bracket 91 has an opening 93 which makes it possible for the markings which are attached to one side of the measurement tape to be read out by an optical sensor on the cab. The contacts 92 are routed outwardly via a cable 94, for example, to the electronics of a safety device. The connection contacts 95*a*, 95*b* are also formed as piercing contacts. The blade 95*c* is an insulator that severs the electrical line of the measurement tape. Contacting thus takes place before and after the interruption via the piercing contacts 95*a*, 95*b*. They are connected to safety electronics and bridge the interruption during normal operation. An interruption thus actually occurs only in the event of a corresponding defect. This interruption causes a disconnection in the safety circuit, resulting, for example, in the drive of the elevator being interrupted. It is thus a fail-safe circuit for increasing safety.

Figure 10:
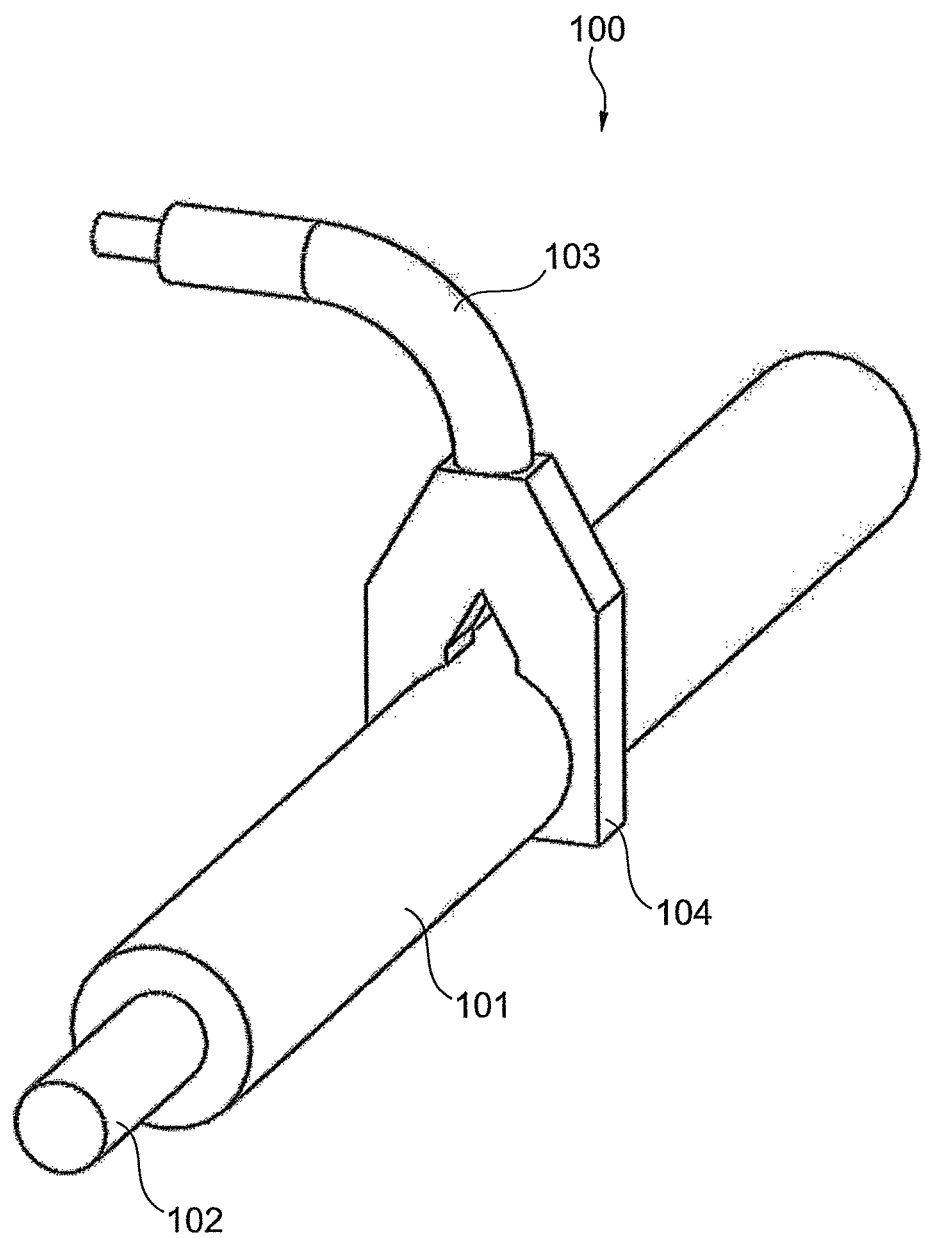
FIG. 10 shows a crimping device.

FIG. 10 shows a contacting option. A communication line 100 which is situated along a measurement tape is depicted initially. It comprises insulation 101 in the outer area and a conductor wire 102 which is situated in the center of the line 100. To connect the wire 102 to a cable 103, a piercing contact 104 is attached to the cable 103 whose cutting edges are able to sever the insulation 101, and also partially penetrate the material of the wire 102 at least in the edge area. As a result, a particularly stable and reliable electrical connection is established.

Figure 11:
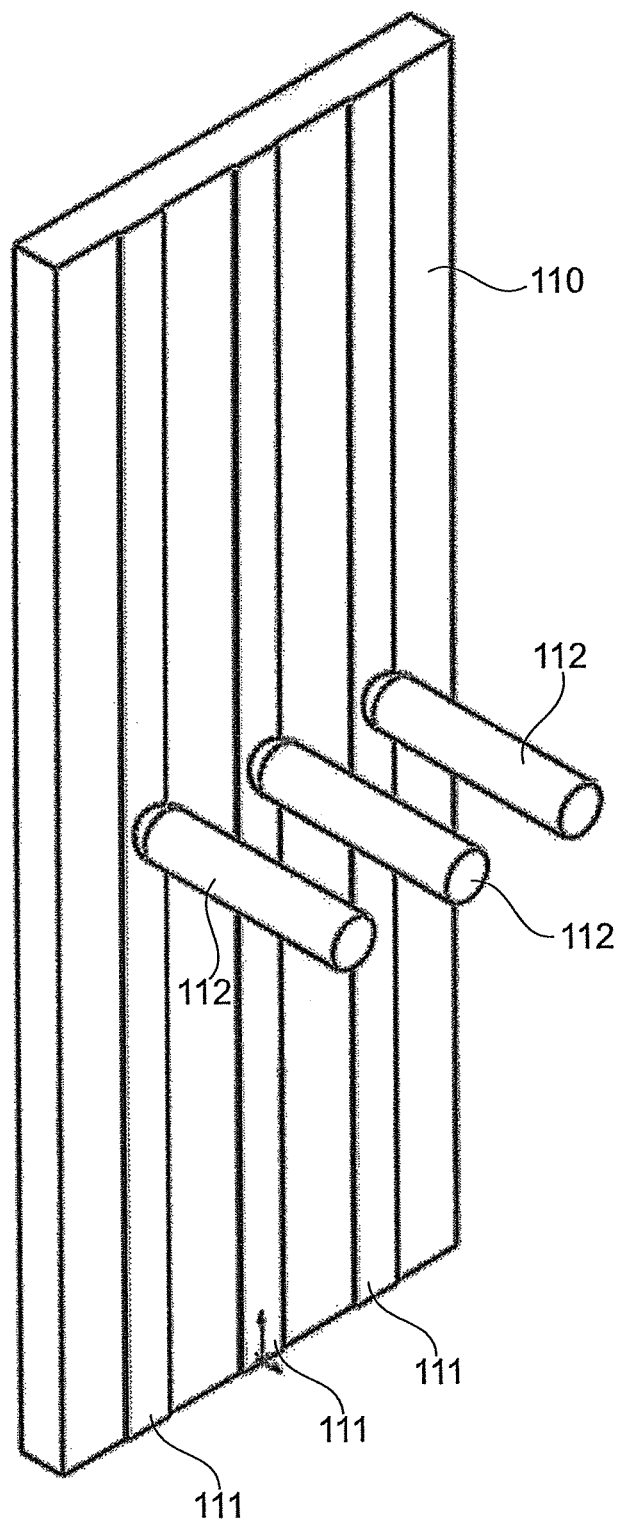
FIG. 11 shows spring-loaded contact pins.

FIG. 11 shows a measurement tape 110 on which conducting paths 111 are imprinted. They are contacted via spring-loaded contact pins 112. These pins thus receive a contact force via a pressurized spring which ensures that a stable contact is established between the pin and the conducting path 111.

Figure 12:
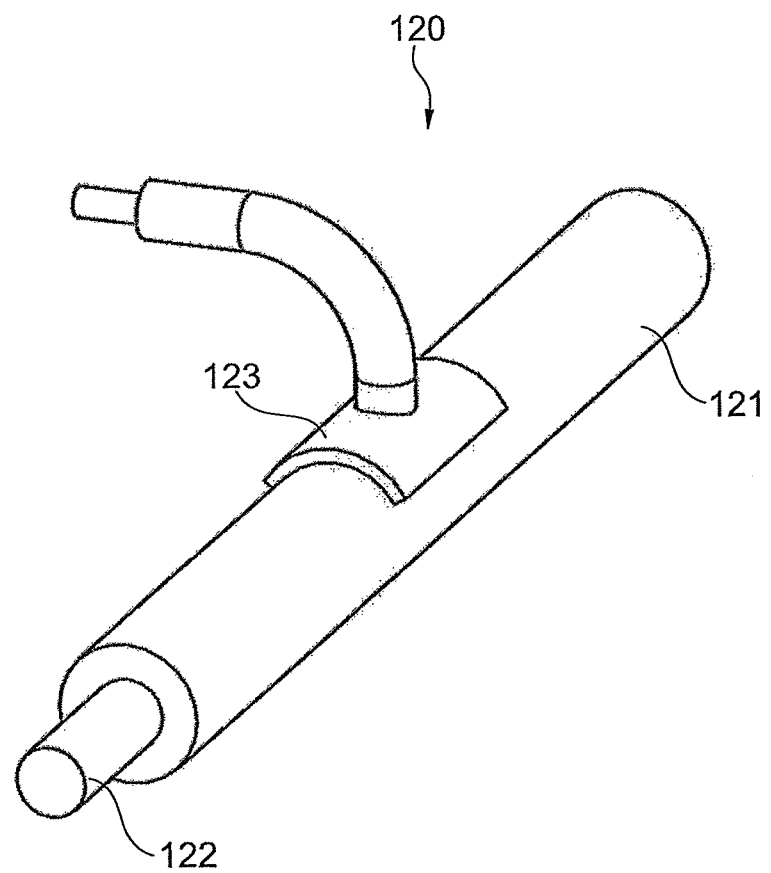
FIG. 12 shows a capacitive connection.
Figure 13:
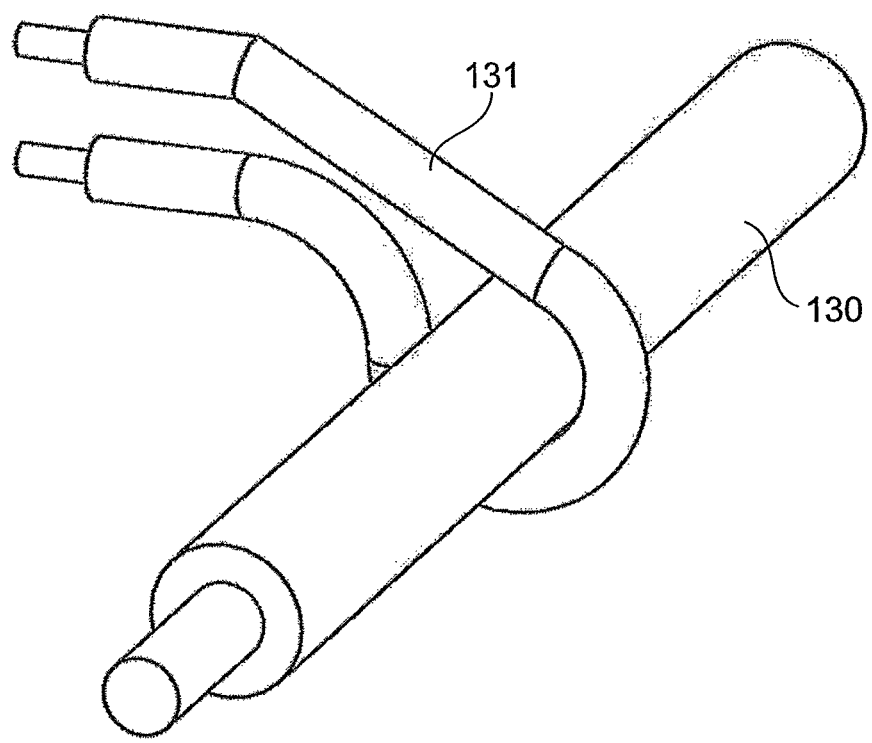
FIG. 13 shows a single-loop inductive connection.
Figure 14:
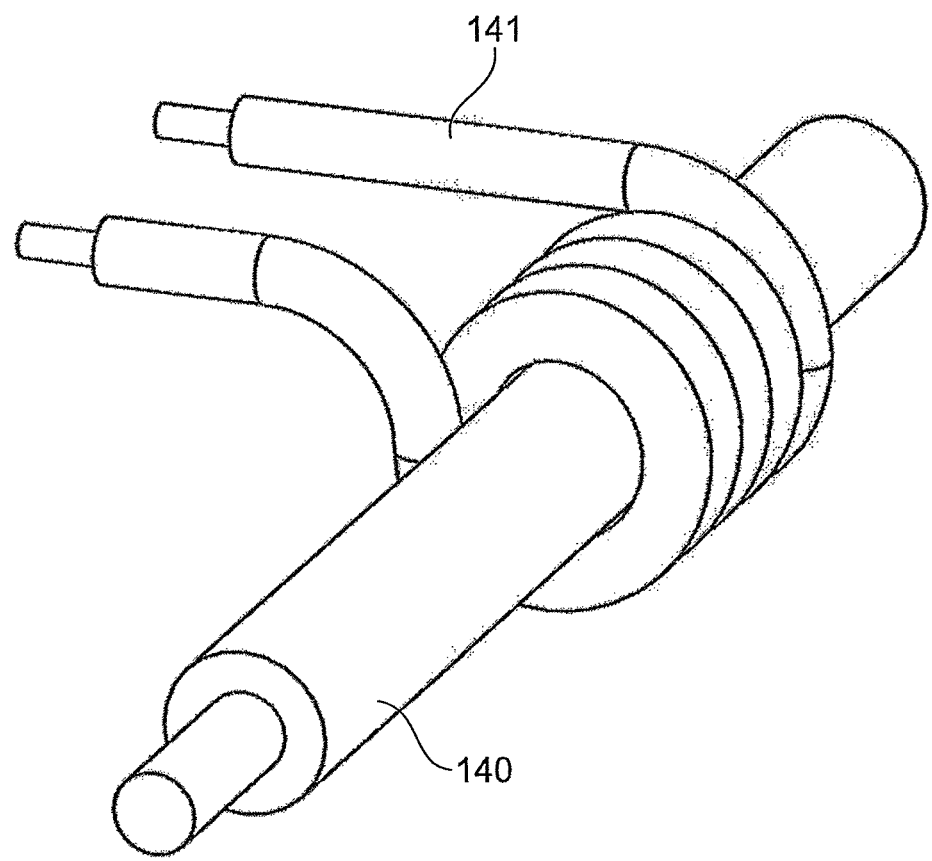
FIG. 14 shows a multiple-loop inductive connection.

In addition, there are, for example, options to establish a wireless connection. FIG. 12 shows a capacitive connection of a line 120 to an insulator 121 and a line wire 122. A kind of clamp 123 is provided in the outer area of the insulation 121 which partially circles the line 120. The clamp 123 thus acts as a capacitor plate, so that a capacitive connection is produced between the clamp 123 and the wire 122. FIGS. 13 and 14 depict inductive couplings in that the line 131 is wound around the line 130, and the line 141 is wound around the line 140.

Figure 15:
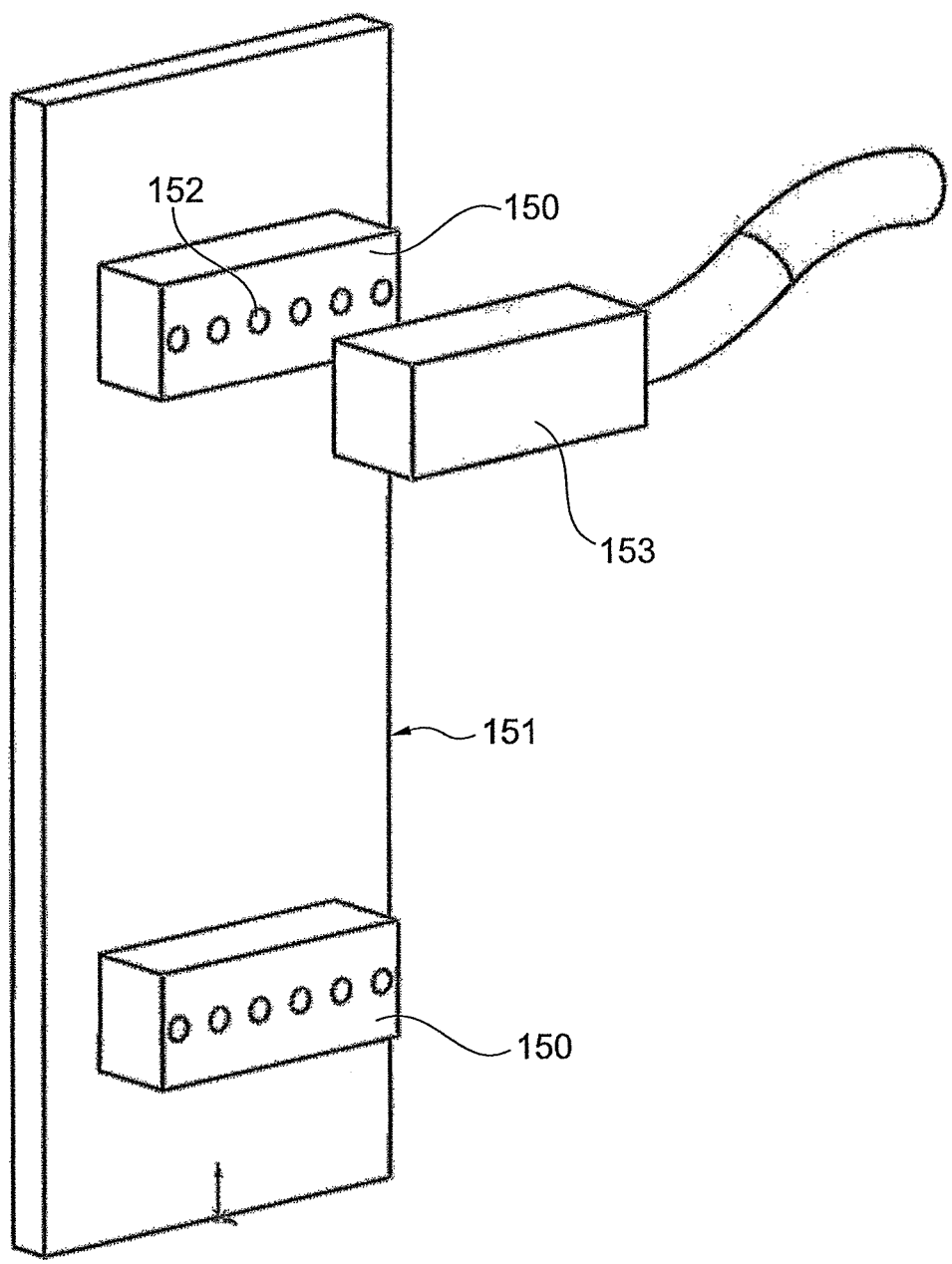
FIG. 15 shows a plug contacting element on the measurement tape.

A particularly elegant connection is depicted in FIG. 15. In a similar way, regular openings for contacting may be provided in the ground cage, it is also possible to arrange prefabricated sockets 150 at regular intervals, for example, at two-meter intervals. It is also conceivable to attach them at each floor. Each individual line in a measurement tape 151 is contactable via these sockets 150, since each female connection 152 is already precontacted to a corresponding line in the measurement tape 151. Another plug 153 is then required for contacting which may be plugged in at the corresponding position. The sockets 150 may possibly have a cover which is removable or is hinged, in the event that they are not required and thus must be protected from dirt. However, for the stability of the tape, such sockets 150 also have the advantage that they are in particular able to protect against torsion along the longitudinal axis. The socket 150 may be designed in such a way that it, for example, may be detected by an optical camera system of the cab, for example, by having the corresponding marking units itself. In addition, other optical indicators, for example, light-emitting diodes (LEDs) may be present which indicate whether a connection plug 153 is plugged into one of the corresponding sockets 150. A separate address may be assigned to each socket 150. The socket may be clamped, glued, soldered, screwed, clipped, or connected in another way to the measurement tape.

Figure 16:
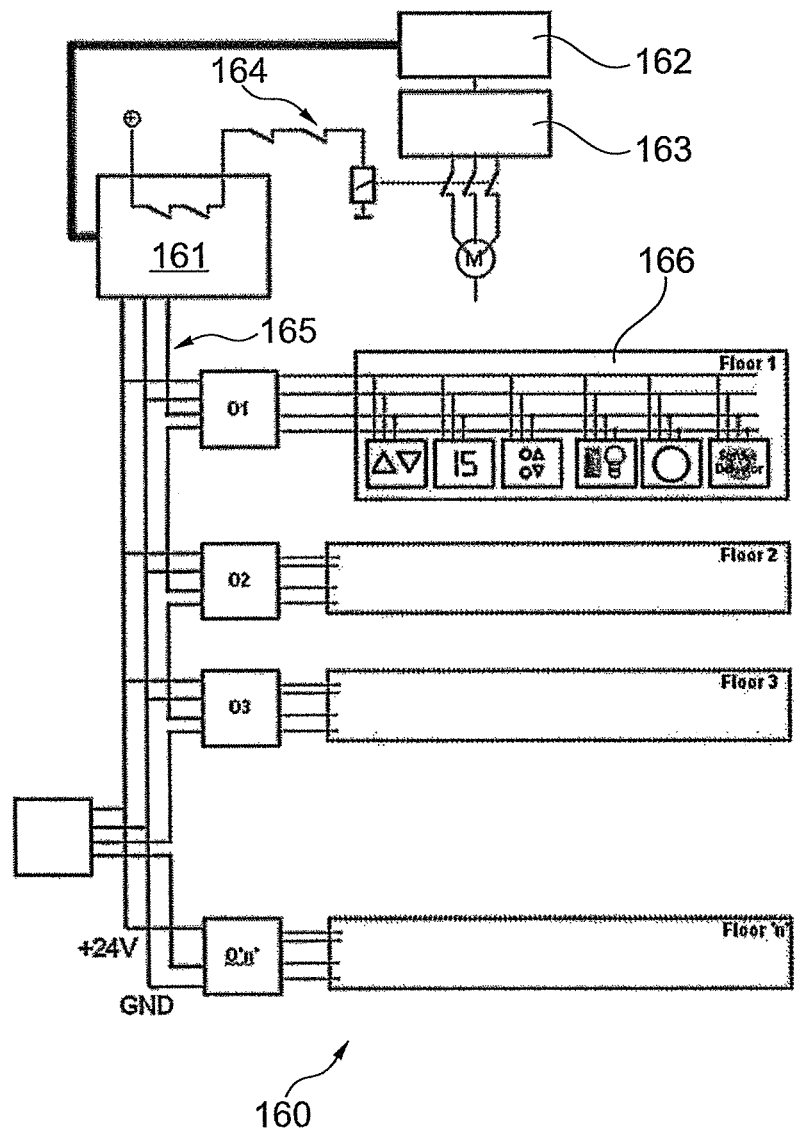
FIG. 16 shows a safety system having a bus.

FIG. 16 shows, for example, a corresponding safety device 160 which has a safety controller 161 which is connected to the elevator controller 162 and thus is able to directly control the drive of the elevator 163. In particular, the safety controller 161 is able to directly switch off the drive of the elevator via an emergency switch 164. An optical switch O1, O2, O3, On is provided to each floor which, for example, may be connected to other components via a bus line, for example, using position information or using operating switches of the elevator. Each optical switch O1, O2, O3, On indicates whether, for example, a shaft door is opened or closed. These corresponding bus lines, as well as power lines and ground lines 165, may correspondingly be routed over all the floors via a measurement tape according to the present invention.

Figure 17:
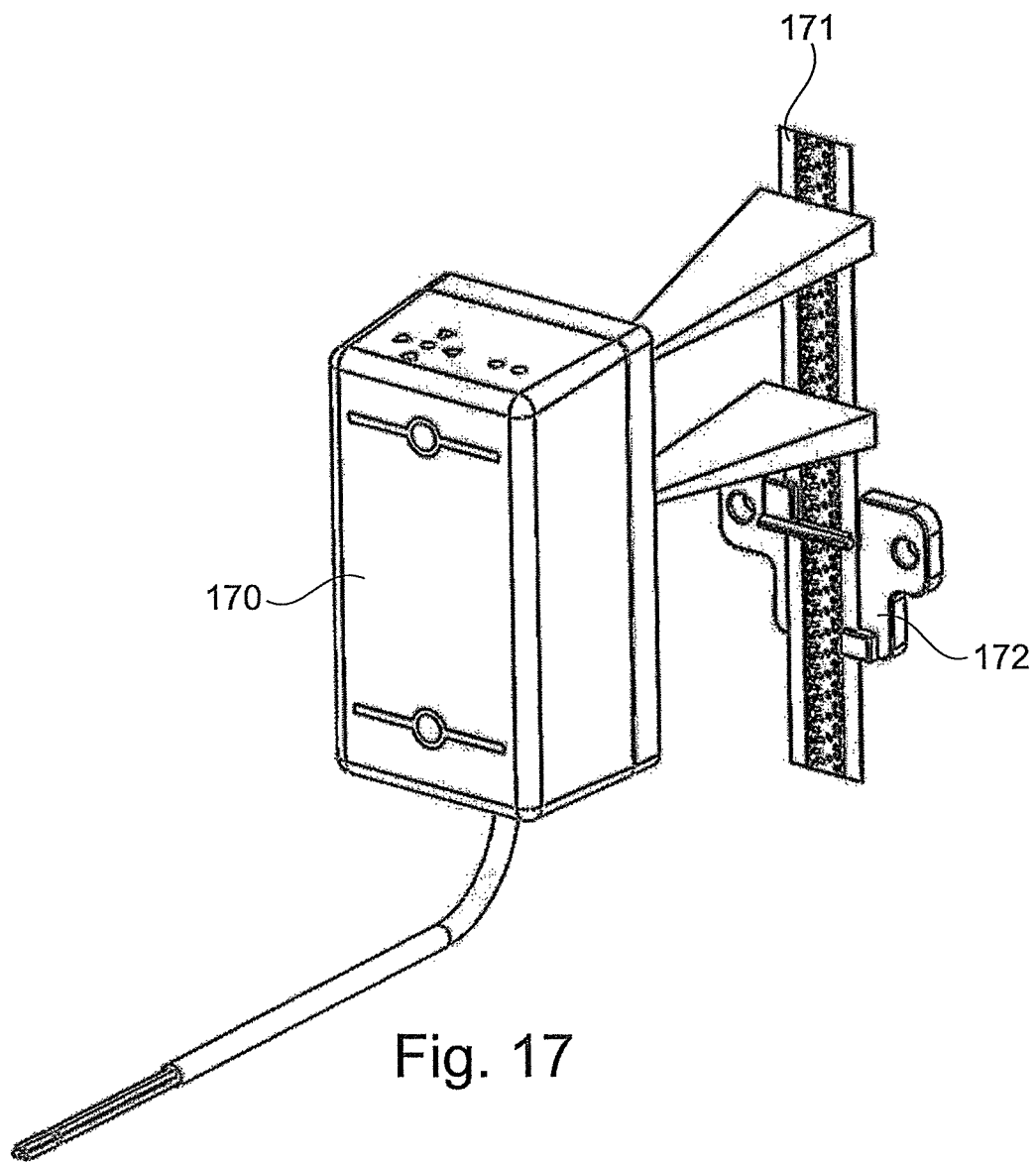
FIG. 17 shows a position sensor on the cab when reading out a measurement tape/code strip.
Figure 18:
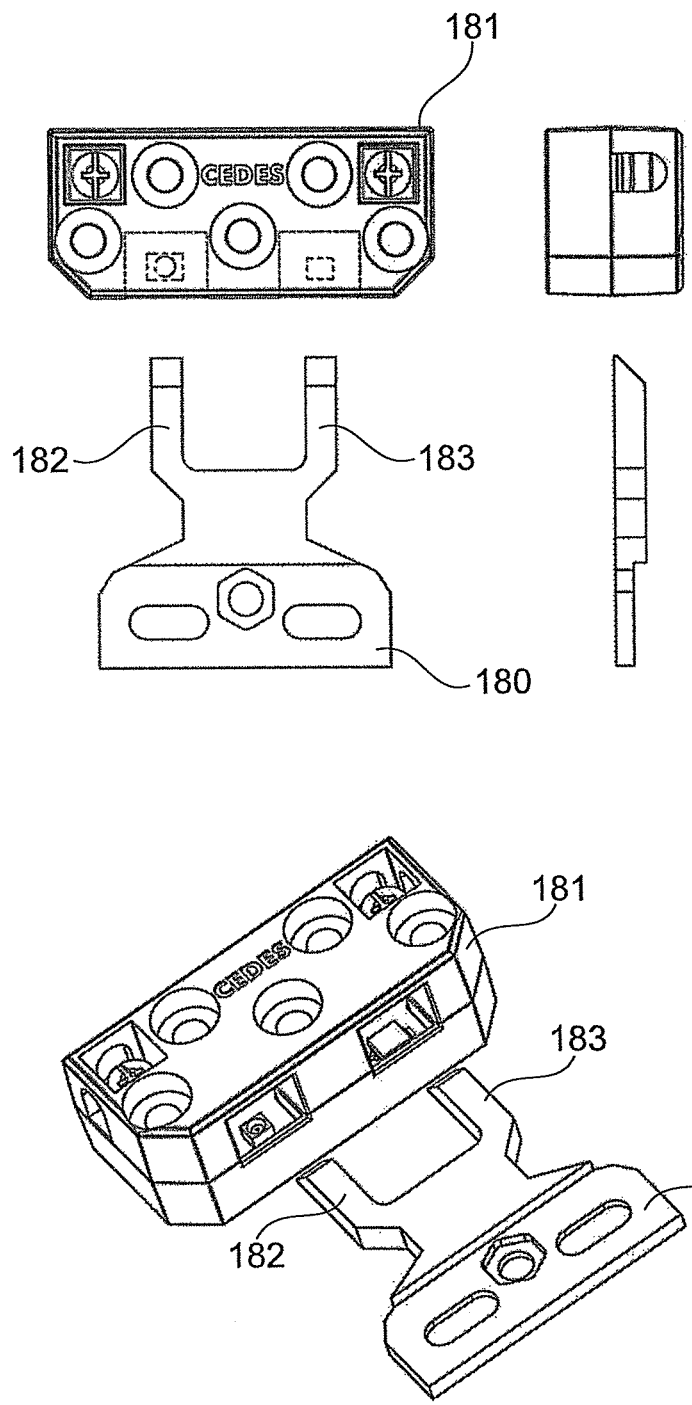
FIG. 18 shows an optical switch.

FIG. 17 shows a sensor 170 situated on a cab, which comprises a light source and an optical receiver, by which a measurement tape 171 which carries a marking may be read out. In addition, a support 172 for the movable support of the measurement tape 171 is visible. The optical switches shown in FIG. 16 are once again depicted in greater detail in FIG. 18. When closing a contact, a contact bridge 180 engages with the corresponding slot of a main element 181. The two legs 182 and 183 of the optical bridge 180 respectively constitute a light transmitter and a light receiver, while an optical conductor is situated in the main element 181, so that optical conduction from 182 to 183 may occur only if the bridge 180 correctly engages with the device 181. The switch is 'closed' only under this condition, which, for example, means that it may be determined with certainty that a door on an elevator is actually closed.

Figure 19:
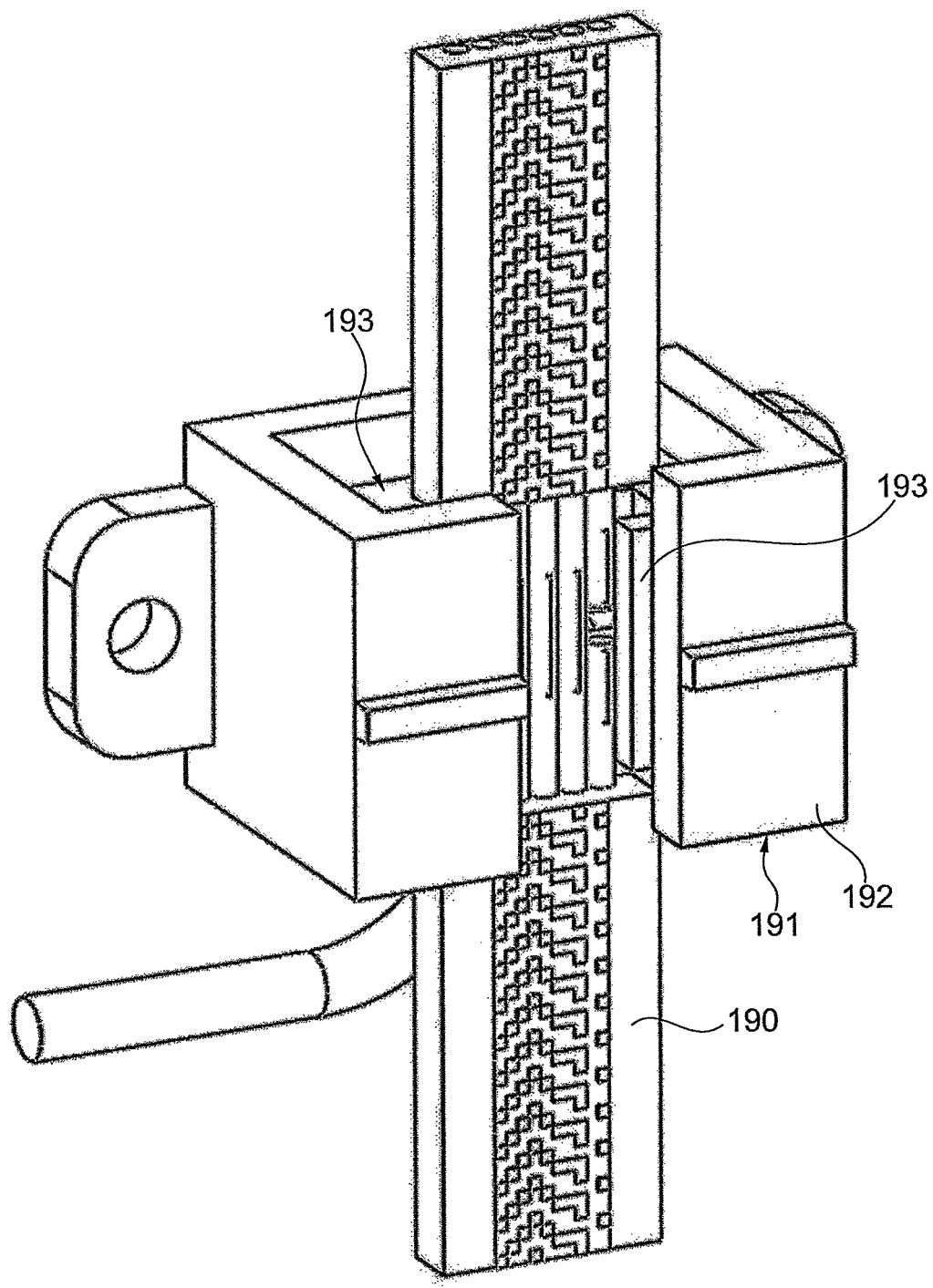
FIG. 19 shows a connecting device having a moving contacting element.
Figure 20:
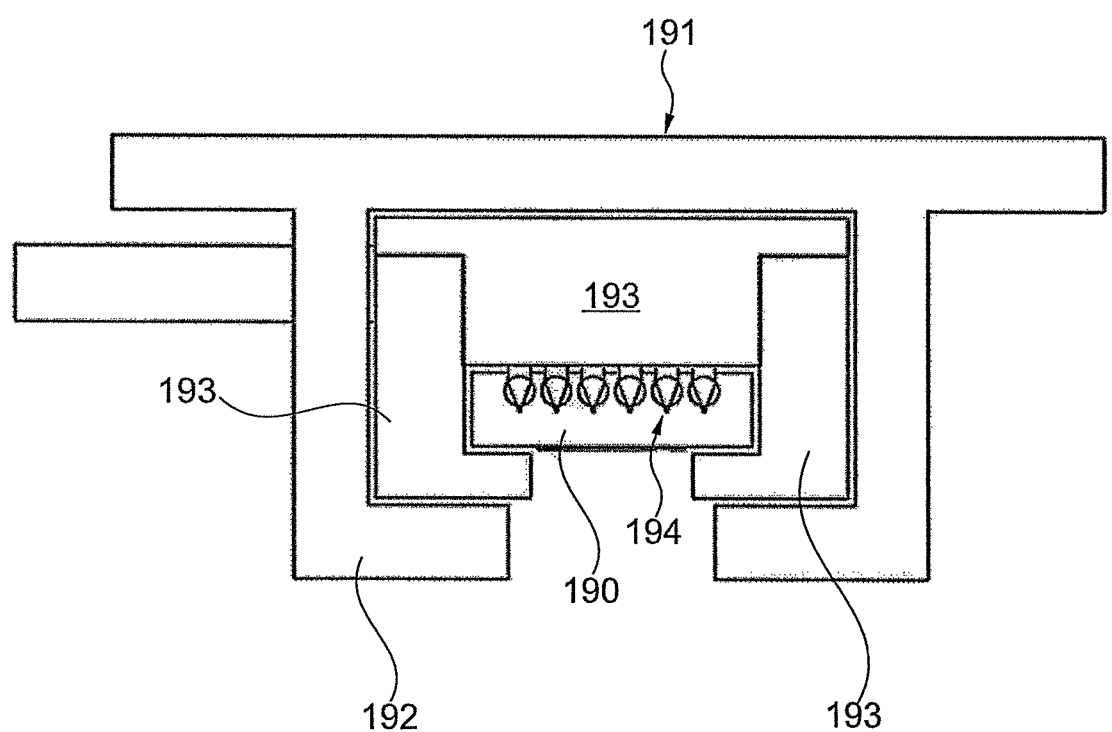
FIG. 20 shows a connecting device having a moving contacting element (top view).

FIG. 19 shows a measurement tape 190 having a connecting device 191 having a contacting device 193 which is movably supported in a support 192, via which the lines in the measurement tape may be (firmly) contacted (via piercing contacts 194), whereby building changes caused by the settling of the building over time may be detected. The measurement tape 190 moves relative to the shaft wall and takes the contacting device 193 with it, and thus moves relative to the shaft wall and hence the support 192. FIG. 20 shows a top view of the device according to FIG. 19.

In additional specific embodiments, it is conceivable that the connecting device may lie over the marking and covers it, in particular, if the connecting device itself is provided as a marking unit and contains information which, for example, is attached to its outer side. In particular, this may be position information. Various transmission options are conceivable for information transmission and communication. In particular, various bus systems may also be employed. Both a unidirectional and a bidirectional communication bus are conceivable.

It is also conceivable to arrange wires having a low ohmic resistance along the measurement tape by either using metals which are highly conductive, or by using wires having a large cross section. This measure may be advantageous in particular if the wires are used for supplying power, since the wires then have a lower inherent resistance and the losses are lower.

The number of lines may be chosen variously, for example, 2, 5 or even more. Two lines may be used for supplying power and constitute taps of a voltage source, at least one line may be provided as ground, and two additional cables may be used for communication. At least one of the wires may be advantageously connected to a safety device. A CAN bus or an RS-485 bus may be used as a bus system. The main power lines may also be used for communication if the signals are modulated. The modulation may be modeled on AM, FM, ASK, FSK, PSK, QPSK, QQPSK, M-PSK, pi/4-PSK, MSK, GMSK or other modulation methods. Communication may generally be carried out by analog or digital means.

The twisted line pairs for shielding may, for example, have an impedance of 100 ohms.

In one particularly preferred specific embodiment, a first layer is present which protects the surface from dirt, scratches, or other mechanical effects and includes an imprinted code for determining the position. Behind it is situated a layer which is transparent to infrared, which as a whole acts as a reflector (in that the corresponding surface on the side facing them has a reflecting boundary surface layer). The entire measurement tape or code tape has a carrier tape which is made of metal or a reinforced material in order to ensure mechanical stability. The degree of reinforcement and the kind of reinforcement depend on the length of the measurement tape. The lines are designed as cables and are twisted together in pairs, so that shielding may be achieved in this way. In addition, metallic casings or casings conducting in another manner are provided. Layers which are used for mechanical reinforcement may also be used for shielding or, for example, as carriers for the imprinted position code or as reflective layers. The different layers are laminated to each other or glued together.

In total, five lines are used in the preferred specific embodiment of the present invention: two for supplying power, two for communication (not for a safety device, but for other communication), and a bus line. The bus line is used by the safety device together with the ground line. Even greater stability may be achieved via another additional ground line. In such a specific embodiment, it is also conceivable to use conducting paths which may be imprinted, instead of wires. These conducting paths are thus not twisted together, but are arranged above one another in a meandering manner, so that a shielding effect may be achieved.

The connection to each of the individual lines is established via gold contacts which, for example, are crimped through the insulation. The twisting of the wire pairs is carried out in such a way that it periodically results in the same pattern approximately every two meters, so that the connections regularly match at corresponding positions with a particular degree of certainty. The connection sockets are clamped to the measurement tape and are connected to the safety system and other auxiliary devices.

The measurement tape is grounded only at one position. An anti-interference capacitor is situated on the other end of the measurement tape so that the measurement tape does not act as an antenna. The safety bus runs via an analog line, power and voltage modulation being carried out. All other devices and auxiliary devices are implemented via the two lines provided for other communication.

LIST OF REFERENCE NUMBERS

A Elevator device
S Elevator shaft
K Cab
M1 Marking
M2 Marking
M3 Marking
Mn Marking
V1 Connecting devices
V2 Connecting devices
Vn Connecting devices
1 Measurement tape
2 Upper suspension
3 Marking side
4 Line side
5 Communication lines
6 Data lines
7 Electronics unit
8 Optical sensor
10 Measurement tape
11 Carrier tape
12 Side area
13 Marking strip
14 Lines
15 Section of the inner area
20 Measurement tape
21 Carrier
22 Reflector
23 Plastic layer
24 Air gap
25 Code impression
26 Attachment
27 Insulator
28 Copper or aluminum line
29 Insulator
30 Conducting path
31 Insulating layer
40 Measurement tape
41 Line
42 Metal cage
43 Marking
44 Line
45 Galvanic isolation
46 Ground cable
47 Anti-interference capacitor
C1 Clip
C2 Clip Cn Clip
50 Measurement tape
51 Line
52 Metal cage
53 Marking
54 Line
55 Galvanic isolation
56 Ground cable
57 Ground cable
58a Ground cable
58b Ground cable
58n Ground cable
61 Conductor pair
62 Conductor pair
63 Conductor pair
64 Ground cable
65 Ground cable
66 Ground cable
67 Ground cable
68 Grounded cover
69 Opening
71 Line pairs
72 Line pairs
73 Line pairs
74 Ground cable
75 Ground cable
76 Ground cable
77 Ground cable
78 Shielding
79 Opening
81 Conducting path pair
82 Conducting path pair
83 Conducting path pair
84 Contact
85 Shielding
90 Connecting device
91 Bracket
92 Connecting electrode/piercing contact
93 Opening
94 Cable
95a Piercing contact
95b Piercing contact
95c Insulating interruption knife
100 Line
101 Insulation
102 Line wire
103 Cable
104 Crimping device
110 Measurement tape
111 Conducting path
112 Consumer finger
120 Cable
121 Insulation
122 Wire
123 Capacitor plate
130 Cable
131 Cable
140 Cable
141 Cable
150 Socket
151 Measurement tape
152 Female contacting connector
153 Plug
160 Safety system
161 Safety controller
161 Elevator controller
163 Drive
164 Direct disconnection
165 Lines
O1 Optical switches
O2 Optical switches
O3 Optical switches
On Optical switches
166 Auxiliary devices
170 Optical sensor
171 Measurement tape
172 Support
180 Optical bridge
181 Main element
182 Leg
183 Leg
190 Measurement tape/code tape
191 Connecting device
192 Support
193 Movably supported contacting element
194 Piercing contacts

We claim:

1. A measurement tape for determining the position of a cab in an elevator shaft, wherein the measurement tape is situated vertically in the elevator shaft, and is configured to extend over at least two floors, and wherein the measurement tape includes a marking unit for marking at least two positions in the elevator shaft, wherein the marking unit runs along the length of the measurement tape, wherein the measurement tape includes a carrier tape and has a transmission device for transmitting information, wherein the transmission device includes at least one communication line for transmitting an information signal and/or at least one supply line for supplying power, and the at least one communication line and/or supply line run(s) along the length of the measurement tape, wherein the communication line comprises an electrical line for transmitting an electrical signal or as a fiberglass line for transmitting an optical signal.

2. The measurement tape according to claim 1, wherein an upper and/or lower mounting device is provided for suspending the measurement tape in an upper or lower region of the elevator shaft, in particular from the ceiling or from the floor of the elevator shaft.

3. The measurement tape according to claim 1, wherein the measurement tape comprises a composite tape further comprising the carrier tape and at least one composite layer.

4. The measurement tape according to claim 1, wherein at least one connection contact is provided for contact-connecting, feeding and/or tapping off the signal transmitted to or from the communication line in the region of the upper mounting device and/or the lower mounting device.

5. The measurement tape according to claim 1, wherein at least one of the communication lines and/or at least one of the supply lines has at least one additional contact for contact-connecting, feeding and/or tapping off the signal transmitted between the upper and/or lower mounting device or between the respective connection contacts in the region of the upper and/or lower mounting device.

6. The measurement tape according to claim 1, wherein the at least one additional contact comprises a plug receptacle and/or a female plug connection, and a removable and/or fold-open cover of the respective additional contact.

7. The measurement tape according to claim 1, wherein at least one of the contact lines and/or supply lines comprises a wire, further comprising an imprinted conducting path, an adhesively bonded conducting path or a conducting path on a flexible printed circuit.

8. The measurement tape according to claim 1, wherein at least one of the contact lines and/or supply lines is shielded wherein at least one ground line provides shielding.

9. The measurement tape according to claim 1, wherein at least two of the contact lines and/or one of the contact lines and one of the ground lines are arranged in a twisted-together and/or criss-crossing manner for shielding purposes.

10. The measurement tape according to claim 1, wherein the communication line comprises a bus configured to transmit data in a unidirectional and/or bidirectional manner.

11. The measurement tape according to claim 1, further comprising a grounding device for grounding the measurement tape and for shielding the lines, said grounding device comprising a shielding cage and/or casing which surrounds the at least one communication line and/or supply line.

12. The measurement tape according to claim 1, wherein the grounding device configured to connect to ground only at the upper end of the measurement tape, and/or at the lower end of the measurement tape via a capacitance in the form of an anti-interference capacitor.

13. The measurement tape according to claim 1, wherein the measurement tape is configured to connect to ground at at least three points at regular intervals.

14. The measurement tape according to claim 1, wherein the measurement tape is comprised at least partially of an electrostrictive material that changes length upon application of an electrical voltage.

15. A peripheral device for elevator devices, in particular a position determination device or safety device or communication device having a measurement tape according to claim 1.

16. The peripheral device according to claim 15, wherein a testing device tests the measurement tape for breaks and/or stretching of the measurement tape, by carrying out a runtime measurement of a signal through at least one of the contact lines.

17. The peripheral device according to claim 15 wherein a testing device tests the measurement tape for breaks and/or stretching by carrying out a capacitance measurement of at least one of the contact lines.

18. The measurement tape according to claim 11, the carrier tape further comprising a grounding device to ground the measurement tape to galvanically isolate at least one of the contact lines and/or supply lines from connected electronics.

19. The peripheral device according to claim 15 wherein a testing device tests the measurement tape for breaks and/or stretching by a continuity check of at least one of the contact lines.

20. The peripheral device according to claim 15 wherein a testing device tests the measurement tape for breaks and/or stretching by providing a connection test device for testing the connection to at least one of the contact lines at a certain position.

* * * * *